US005617577A

United States Patent [19]

Barker et al.

[11] Patent Number: 5,617,577

[45] Date of Patent: Apr. 1, 1997

[54] ADVANCED PARALLEL ARRAY PROCESSOR I/O CONNECTION

[75] Inventors: Thomas N. Barker, Vestal; Clive A. Collins, Poughkeepsie; Michael C. Dapp, Endwell; James W. Dieffenderfer, Owego; Donald G. Grice; Billy J. Knowles, both of Kingston; Donald M. Lesmeister, Vestal; Richard E. Nier, Apalachin, all of N.Y.; Eric E. Retter, Warren Center, Pa.; David B. Rolfe, West Hurley; Vincent J. Smoral, Endwell, both of N.Y.

[73] Assignee: International Business Machines Corporation, Armonk, N.Y.

[21] Appl. No.: 400,687

[22] Filed: Mar. 8, 1995

Related U.S. Application Data

[63] Continuation of Ser. No. 887,259, May 22, 1992, abandoned, and a continuation-in-part of Ser. No. 301,278, Sep. 6, 1994, which is a continuation of Ser. No. 611,594, Nov. 13, 1990, abandoned, and a continuation-in-part of Ser. No. 324,295, Oct. 17, 1994, Pat. No. 5,475,856, which is a continuation of Ser. No. 798,788, Nov. 27, 1991, abandoned.

[51] Int. Cl.$^6$ .................................................. G06F 13/00
[52] U.S. Cl. ............................... 395/800; 364/DIG. 1; 364/DIG. 2
[58] Field of Search .................... 395/800; 364/DIG. 1, 364/DIG. 2

[56] References Cited

U.S. PATENT DOCUMENTS 3,537,074  12/1967  Stokes et al. ............................ 340/172
3,544,973  12/1970  Borek et al. ......................... 340/172.5

(List continued on next page.)

FOREIGN PATENT DOCUMENTS 0132926  2/1985  European Pat. Off. .

| | | |
|---|---|---|
| 208457A2 | 6/1986 | European Pat. Off. . |
| 0208497 | 6/1986 | European Pat. Off. . |
| 340668A2 | 4/1989 | European Pat. Off. . |
| 428327A1 | 11/1990 | European Pat. Off. . |

(List continued on next page.)

OTHER PUBLICATIONS

T.A. Kriz and M.J. Marple, "Multi–Port Bus Structure With Fast Shared Memory", IBM Technical Disclosure Bulletin, vol. 27, No. 10A, pp. 5579–5580, Mar. 1985.

(List continued on next page.)

*Primary Examiner*—Tod R. Swann
*Assistant Examiner*—Valerie Darbe
*Attorney, Agent, or Firm*—Lynn L. Augspurger; Andrew M. Riddles

[57] ABSTRACT

A fast I/O for a multi-PME computer system provides a way to break into a network coupling to alternate network couplings. The system coupling is called a zipper.

Our I/O zipper concept can be used to implement the concept that the port into a node could be driven by the port out of a node or by data coming from the system bus. Conversely, data being put out of a node would be available to both the input to another node and to the system bus. Outputting data to both the system bus and another node is not done simultaneously but in different cycles. The zipper passes data into and out of a network of interconnected nodes is used in a system of interconnecting nodes in a mesh, rings of wrapped tori. such that there is no edge to the network, the zipper mechanism logically breaks the the rings along a dimension orthogonal to the rings such that an edge to the network is established. The coupling dynamically toggles the network between a network without an edge and a network with an edge. Data passes into the network or out of the network through the edge when it is active, and the coupling permits dispersal of data entering the network or collection of data leaving the network such that the data rate through the edge matches both the sustained and peak data rates of the system external to the network.

14 Claims, 13 Drawing Sheets

5,617,577
Page 2

U.S. PATENT DOCUMENTS

| | | | |
|---|---|---|---|
| 3,970,993 | 7/1976 | Finnila | 340/172.5 |
| 4,101,960 | 7/1978 | Stokes et al. | 364/200 |
| 4,107,773 | 8/1978 | Gilbreath et al. | 364/200 |
| 4,270,170 | 5/1981 | Reddaway | 364/200 |
| 4,314,349 | 2/1982 | Batcher | 364/716 |
| 4,338,675 | 7/1982 | Palmer et al. | 364/748 |
| 4,380,046 | 4/1983 | Fung | 364/200 |
| 4,394,726 | 7/1983 | Kohl | 364/200 |
| 4,412,303 | 10/1983 | Barnes et al. | 364/900 |
| 4,435,758 | 3/1984 | Lorie et al. | 364/200 |
| 4,467,422 | 8/1984 | Hunt | 364/200 |
| 4,468,727 | 8/1984 | Carrison | 364/200 |
| 4,498,133 | 2/1985 | Bolton et al. | 364/200 |
| 4,498,134 | 2/1985 | Hansen et al. | 364/200 |
| 4,523,273 | 6/1985 | Adams, III et al. | 364/200 |
| 4,598,400 | 7/1986 | Hillis | 370/60 |
| 4,604,695 | 8/1986 | Widen et al. | 364/200 |
| 4,621,339 | 11/1986 | Wagner et al. | 364/200 |
| 4,622,650 | 11/1986 | Kulisch | 364/748 |
| 4,706,191 | 11/1987 | Hamstra et al. | 364/200 |
| 4,720,780 | 1/1988 | Dolecek | 364/200 |
| 4,736,291 | 4/1988 | Jennings et al. | 364/200 |
| 4,739,474 | 4/1988 | Holsztynski | 364/200 |
| 4,739,476 | 4/1988 | Fiduccia | 364/200 |
| 4,748,585 | 5/1988 | Chiarulli | 364/900 |
| 4,763,321 | 8/1988 | Calvignac et al. | 370/94 |
| 4,780,873 | 10/1988 | Mattheyses | 370/94 |
| 4,783,738 | 11/1988 | Li et al. | 364/200 |
| 4,783,782 | 11/1988 | Morton | 371/11 |
| 4,805,091 | 2/1989 | Thiel et al. | 364/200 |
| 4,809,159 | 2/1989 | Sowa | 364/200 |
| 4,809,169 | 2/1989 | Sfarti et al. | 364/200 |
| 4,809,347 | 2/1989 | Nash et al. | 382/49 |
| 4,814,980 | 3/1989 | Peterson et al. | 364/200 |
| 4,825,359 | 4/1989 | Ohkami et al. | 364/200 |
| 4,831,519 | 5/1989 | Morton | 364/200 |
| 4,835,729 | 5/1989 | Morton | 364/200 |
| 4,841,476 | 6/1989 | Mitchell et al. | 364/900 |
| 4,847,755 | 7/1989 | Morrison et al. | 364/200 |
| 4,849,882 | 7/1989 | Aoyama et al. | 364/200 |
| 4,852,048 | 7/1989 | Morton | 364/200 |
| 4,855,903 | 8/1989 | Carleton et al. | 364/200 |
| 4,858,110 | 8/1989 | Miyata | 364/200 |
| 4,860,201 | 8/1989 | Stolfo et al. | 364/200 |
| 4,872,133 | 10/1989 | Leeland | 364/748 |
| 4,873,626 | 10/1989 | Gifford | 364/200 |
| 4,891,787 | 1/1990 | Gifford | 364/900 |
| 4,896,265 | 1/1990 | Fiduccia et al. | 364/200 |
| 4,901,224 | 2/1990 | Ewert | 364/200 |
| 4,903,260 | 2/1990 | Boettle et al. | 370/60 |
| 4,905,143 | 2/1990 | Takahashi et al. | 364/200 |
| 4,907,148 | 3/1990 | Morton | 364/200 |
| 4,910,665 | 3/1990 | Mattheyses et al. | 364/200 |
| 4,915,652 | 4/1990 | Schwarz | 364/748 |
| 4,916,657 | 4/1990 | Morton | 364/900 |
| 4,920,484 | 4/1990 | Ranade | 364/200 |
| 4,922,408 | 5/1990 | Davis et al. | 364/200 |
| 4,925,311 | 5/1990 | Neehes et al. | 364/200 |
| 4,933,846 | 6/1990 | Humphrey et al. | 364/200 |
| 4,933,895 | 6/1990 | Grinberg et al. | 364/748 |
| 4,942,516 | 7/1990 | Hyatt | 364/200 |
| 4,942,517 | 7/1990 | Cok | 364/200 |
| 4,943,912 | 7/1990 | Aoyma et al. | 364/200 |
| 4,956,772 | 9/1990 | Neches | 364/200 |
| 4,958,273 | 9/1990 | Anderson et al. | 364/200 |
| 4,964,032 | 10/1990 | Smith | 364/200 |
| 4,967,340 | 10/1990 | Dawes | 364/200 |
| 4,975,834 | 12/1990 | Xu et al. | 364/200 |
| 4,985,832 | 1/1991 | Grondalski | 364/200 |
| 4,992,926 | 2/1991 | Janke et al. | 364/134 |
| 4,992,933 | 2/1991 | Taylor | 364/200 |
| 5,005,120 | 4/1991 | Ruetz | 364/200 |
| 5,006,978 | 4/1991 | Neches | 364/200 |
| 5,008,815 | 4/1991 | Hillis | 364/200 |
| 5,008,882 | 4/1991 | Peterson et al. | 370/94.3 |
| 5,010,477 | 4/1991 | Omoda et al. | 364/200 |
| 5,016,163 | 5/1991 | Jesshope et al. | 364/200 |
| 5,020,059 | 5/1991 | Gorin et al. | 371/11.3 |
| 5,021,945 | 6/1991 | Morrison et al. | 364/200 |
| 5,038,282 | 8/1991 | Gilbert et al. | 364/200 |
| 5,038,386 | 8/1991 | Li | 382/49 |
| 5,041,189 | 8/1991 | Tamitani | 364/200 |
| 5,041,971 | 8/1991 | Carvey et al. | 364/200 |
| 5,045,995 | 9/1991 | Levinthal et al. | 364/200 |
| 5,047,917 | 9/1991 | Athas et al. | 364/200 |
| 5,049,982 | 9/1991 | Lee et al. | 357/81 |
| 5,056,000 | 10/1991 | Chang | 364/200 |
| 5,072,217 | 12/1991 | Georgiou et al. | 340/825.79 |
| 5,103,393 | 4/1992 | Harris et al. | 395/650 |
| 5,113,523 | 5/1992 | Colley et al. | 395/800 |
| 5,121,498 | 6/1992 | Gilbert et al. | 395/700 |
| 5,129,077 | 7/1992 | Hillis | 395/500 |
| 5,136,582 | 8/1992 | Firoozmand | 370/85.1 |
| 5,142,540 | 8/1992 | Glasser | 371/40.1 |
| 5,146,608 | 9/1992 | Hillis | 395/800 |
| 5,165,023 | 11/1992 | Gifford | 395/325 |
| 5,170,482 | 12/1992 | Shu et al. | 395/800 |
| 5,170,484 | 12/1992 | Gorodalski | 395/800 |
| 5,173,947 | 12/1992 | Chande et al. | 382/41 |
| 5,175,862 | 12/1992 | Phelps et al. | 395/800 |
| 5,175,865 | 12/1992 | Hillis | 395/800 |
| 5,181,017 | 1/1993 | Frey, Jr. et al. | 340/825.02 |
| 5,187,801 | 2/1993 | Zenios et al. | 395/800 |
| 5,189,665 | 2/1993 | Nichaus et al. | 370/458.1 |
| 5,197,130 | 3/1993 | Chen et al. | 395/325 |
| 5,212,773 | 5/1993 | Hillis | 395/200 |
| 5,212,777 | 5/1993 | Gove et al. | 395/375 |
| 5,218,676 | 6/1993 | Ben-Ayed et al. | 395/200 |
| 5,218,709 | 6/1993 | Fijany et al. | 395/800 |
| 5,230,079 | 7/1993 | Grondalski | 395/800 |
| 5,239,629 | 8/1993 | Miller et al. | 395/325 |
| 5,239,654 | 8/1993 | Ing-Simmons et al. | 395/800 |
| 5,251,097 | 10/1993 | Simmons et al. | 361/687 |
| 5,253,359 | 10/1993 | Spix et al. | 395/575 |
| 5,265,124 | 11/1993 | Staab et al. | 375/3 |
| 5,280,474 | 1/1994 | Nickolls et al. | 370/60 |
| 5,280,620 | 1/1994 | Sluijter et al. | 395/800 |
| 5,297,260 | 3/1994 | Kametani | 395/325 |
| 5,355,508 | 10/1994 | Kan | 395/800 |
| 5,367,636 | 11/1994 | Colley et al. | 395/200 |

FOREIGN PATENT DOCUMENTS

| | | |
|---|---|---|
| 429733A2 | 6/1991 | European Pat. Off. |
| 460599A3 | 12/1991 | European Pat. Off. |
| 485690A2 | 5/1992 | European Pat. Off. |
| 493876A2 | 7/1992 | European Pat. Off. |
| 2223867 | 4/1990 | United Kingdom |
| 89/09967 | 4/1988 | WIPO |
| 92/06436 | 4/1992 | WIPO |

OTHER PUBLICATIONS

H.P. Bakoglu, "Second–Level Shared Cache Implementation For Multiprocessor Computers With A Common Interface For The Second–Level Shared Cache And The Second–Level Private Cache", *IBM Technical Disclosure Bulletin*, vol. 33, No. 11, pp. 362–365, Apr. 1991.

Mansingh et al., "System Level Air Flow Analysis for a Computer System Processing Unit", *Hewlett–Packard Journal*, vol. 41, No. 5, Oct. 1990, pp. 82–87.

Tewksbury et al., "Communication Network Issues and High–Density Interconnects in Large–Scale Distributed Computing Systems", *IEEE Journal on Selected Areas in Communication*, vol. 6, No. 3, Apr. 1988, pp. 587–607.

Boubekeur et al., "Configuring A Wafer–Scale Two–Dimensional Array of Single–Bit Processors", Computer, vol. 2, Issue 4, Apr. 1992, pp. 29–39.

Korpiharju et al., "TUTCA Configurable Logic Cell Array Architecture" IEEE, Sep. 1991, pp. 3–3.1–3–3.4.

C.K. Baru and S.Y.W. Su, "The Architecture of SM3: A Dynamically Partitionable Multicomputer System", IEEE Transactions on Computers, vol. C–35, No. 9, pp. 790–802, Sep. 1986.

S.P. Booth et al., "An Evaluation of the Meiko Computing Surface for HEP Fortran Farming*", Computer Physics Communications 57, pp. 486–491, 1989.

S.P. Booth et al., "Large Scale Applications of Transputers in HEP: The Edinburgh Concurrent Supercomputer Project", Computer Physics Communications 57, pp. 101–107, 1989.

P. Christy, "Software to Support Massively Parallel Computing on the MasPar MP–I", 1990 IEEE, pp. 29–33.

S.R. Colley, "Parallel Solutions to Parallel Problems", Research & Developments, pp. 42–45, Nov. 21, 1989.

J.R. Nickolls, "The Design of the MasPar MP–I: A Cost Effective Massively Parallel Computer", 1990 IEEE, pp. 25–28.

J.F. Prins and J.A. Smith, "Parallel Sorting of Large Arrays on the MasPar MP–I", The 3rd Symposium on the Frontiers of Massively Parallel Computation, pp. 59–64, Oct., 1990.

J.B. Rosenberg and J.D. Becher, "Mapping Massive SIMD Parallelism onto Vector Architectures for Simulation", Software–Practice and Experience, vol. 19(8), pp. 739–756, Aug. 1989.

J.C. Tilton, "Porting an Interative Parallel Region Growing Algorithm from the MPP to the MasPar MP–I", The 3rd Symposium on the Frontiers of Massively Parallel Computation, pp. 170–173, Oct., 1990.

"Sequent Computer Systems Balance and Symmetry Series", Faulkner Technical Reports, Inc., pp. 1–6, Jan., 1988.

"Symmetry 2000/400 and 2000/700 with the DYNIX/ptx Operation System", Sequent Computer Systems Inc.

"Symmetry 2000 Systems—Foundation for Information Advantage", Sequent Computer Systems Inc.

"Our Customers Have Something That Gives Them an Unfair Advantage", The nCUBE Parallel Software Environment, nCUBE Corporation.

Y.M. Leung, "Parallel Technology Mapping With Identification of Cells for Dynamic Cell Generation", Dissertation, Syracuse University, May 1992.

"The Connection Machine CM–5 Technical Summary", Thinking Machines Corporation, Oct., 1991.

Fineberg et al., "Experimental Analysis of a Mixed–Mode Parallel Architecture Using Bitonic Sequence Sorting", *Journal of Parallel And Distributed Computing*, Mar. 1991, pp. 239–251.

T. Bridges, "The GPA Machine: A Generally Partitionable MSIMD Architecture", The 3rd Symposium on the Frontiers of Massively Parallel Computation, Oct. 1990, pp. 196–203.

Abreu et al., "The APx Accelerator", The 2nd Symposium on the Frontiers of Massively Parallel Computation, Oct. 1988, pp. 413–417.

D.A. Nicole, "Esprit Project 1085 Reconfigurable Transputer Processor Architecture", CONPAR 88 Additional Papers, Sep. 1988, pp. 12–39.

E. DeBenedictis and J.M. del Rosario, "nCUBE Parallel I/O Software", IPCCC '92, 1992 IEEE, pp. 0117–0124.

T.H. Dunigan, "Hypercube Clock Synchronization:. Concurrency: Practice and Experience", vol. 4(3), pp. 257–268, May 1992.

T.H. Dunigan, "Performance of the Intel iPSC/860 and Ncube 6400 hypercubes*", Parallel Computing 17, pp. 1285–1302, 1991.

D.D. Gajski and J.K. Peir, "Essential Issues in Multiprocessor Systems", 1985 IEEE, pp. 9–27, Jun. 1985.

A. Holman, "The Meiko Computing Surface: A Parallel & Scalable Open Systems Platform for Oracle", A Study of a Parallel Database Machine and its Performance—The NCR/Teradata DBC/1012, pp. 96–114.

Baba et al., "A Parallel Object–Oriented Tool Architecture: A–NET", Proceedings Supercomputing, Nov. 1990, pp. 276–285.

Mitchell et al., "Architectural Description of a New, Easily Expandable Self–Routing Computer Network Topology", IEEE INFOCOM, Apr. 1989, pp. 981–988.

K. Padmanabhan, "Hierarchical Communication in Cube–Connected Multiprocessors", The 10th International Conference on Distributed Computing Systems, May 1990, pp. 270–277.

Fineberg et al., "Experimental Analysis of Communication/Data–Conditional Aspects of a Mixed–Mode Parallel Architecture via Synthetic Computations", *Proceedings Supercomputing '90*, Nov. 1990, pp. 647–646.

Kan et al., "Parallel Processing on the CAP: Cellular Array Processor", *COMPCON* 84, 16 Sep. 1984, pp. 239–244.

Ezzedine et al., "A 16–bit Specialized Processor Design", *Integration The VLSI Journal*, vol. 6 No. 1, May 1988, pp. 101–110.

A. Mudrow, "High Speed Scientific Arithmetic Using a High Performance Sequencer", *ELECTRO*, vol. 6, No. 11, 1986, pp. 1–5.

Alleyne et al., "A Bit–Parallel, Word–Parallel, Massively Parallel Accociative Processor for Scientific Computing", *Third Symposium on the Frontiers of Massive Parallel Computation*, Oct. 8–10, 1990; pp. 176–185.

Jesshope et al., "Design of SIMD Microprocessor Array", *IEEE Proceedings*, vol. 136., May 1989, pp. 197–204.

DeGroot et al., "Image Processing Using the Sprint Multiprocessors", *IEEE*, 1989, pp. 173–176.

Nudd et al., "An Heterogeneous M–SIMD Architecture for Kalman Filter Controlled Processing of Image Sequences", *IEEE* 1992, pp. 842–845.

Li et al., "Polmorphic–Torus Network", IEEE Transactions on Computers, vol. 38, No. 9, Sep. 1989 pp. 1345–1351.

Li et al., "Sparse Matrix Vector Multiplication of Polymorphic–Torus", IBM Technical Disclosure Bulletin, vol. 32, No. 3A, Aug. 1989, pp. 233–238.

Li et al., "Parallel Local Operator Engine and Fast P300", IBM Tech. Disc. Bulletin, vol. 32, No. 8B, Jan. 1990, pp. 295–300.

R. Duncan, "A Survey of Parallel Computer Architectures", IEEE, Feb. 90' pp. 5–16.

C.R. Jesshope et al., "Design of SIMD Microprocessor Array", UMI Article Clearing house, Nov. 88'.

Sener Ilgen & Isaac Schers, "Parallel Processing on VLSI Associative Memory", NSF Award #ECS–8404627, pp. 50–53.

H. Stone, "Introduction to Computer Architecture", Science Research Associates, 1975, Ch. 8, pp. 318–374.

R. M. Lea, "WASP: A WSI Associative String Processor" Journal of VLSI Signal Processing, May 1991, No. 4, pp. 271–285.

Lea, R.M., "ASP Modules: Cost–Effective Building–Blocks for Real–Time DSP Systems", Journal of VLSI Signal Processing, vol. 1, No. 1, Aug. 1989, pp. 69–84.

Isaac D. Scherson, et al., "Bit Parallel Arithmetic in a Massively–Parallel Associative Processor", IEEE, vol. 41, No. 10, Oct. 1992.

Supreet Singh and Jia–Yuan Han, "Systolic arrays", IEEE, Feb. 1991.

H. Richter and G. Raupp, "Control of a Tokamak Fusion Experiment by a Set of MULTITOP Parallel Computers", IEEE vol. 39, 1992, pp. 192–197.

Higuchi et al., "IXM2: A Parallel Associative Processor for Semantic Net Processing—Preliminary Evaluation", IEEE, Jun. 1990, pp. 667–673.

Frison et al., "Designing Specific Systolic Arrays with the AP115C Chip", IEEE 1990, xii+808pp., 505–517.

Berg et al., "Instruction Execution Trade–Offs for SIMD vs. MIMD vs. Mixed Mode Parallelism", IEEE Feb. 1991, pp. 301–308.

Raghaven et al., "Fine Grain Parallel Processors and Real–Time Applications: MIMD Controller/SIMD Array", IEEE, May 1990, pp. 324–331.

G. J. Lipovski, "SIMD and MIMD Processing in the Texas Reconfigurable Array Computer", Feb. 1988, pp. 268–271.

R.M. Lea, "ASP: A Cost–effective Parallel Microcomputer", IEEE Oct. 1988, pp. 10–29.

Mark A. Nichols, "Data Management and Control–Flow Constructs in a SIMD/SPMD Parallel Language/Compiler", IEEE, Feb. 1990, pp. 397–406.

Will R. Moore, "VLSI For Artificial Intelligence", Kluwer Academic Publishers, Ch. 4.1.

Mosher et al., "A Software Architecture for Image Processing on a Medium–Grain Parallel Machine", SPIE vol. 1659 Image Processing and Interchange, 1992/279.

*Patent Abstracts of Japan,* vol. 8, No. 105, 17 May 1984, p. 274. App. No. JP–820 125 341 (Tokyo Shibaura Denki KK) 27 Jan. 1984.

W.D. Hills, *"The Connection Machine"*, The MIT Press, Chapters 1, 3, and 4.

"Joho–syori", vol. 26(3), 1985–3, pp. 213–225, (Japanese).

| ALLOCATION IN STORAGE | STORAGE ADDRESS RANGE |
|---|---|
| NORMAL Level Unique | 0000-003F 'X' |
| CALL Level Unique | 0040-007F 'X' |
| EXTERNAL I/O Level Unique | 0080-00BF 'X' |
| RIGHT I/O Level Unique | 00C0-00FF 'X' |
| VERTICAL I/O Level Unique | 0100-013F 'X' |
| LEFT I/O Level Unique | 0140-007F 'X' |
| BCI Level Unique | 0180-00BF 'X' |
| MEMORY PARITY Level Unique | 01C0-00FF 'X' |

| ALLOCATION IN LEVEL | STORAGE ADDRESS OFFSET | |
|---|---|---|
| Input Buffer Starting Address | 003C 'X' | 232 |
| Input Data Buffer Count | 003D 'X' | 233 |
| Output Buffer Starting Address | 003E 'X' | 230 |
| Output Data Buffer Count | 003F 'X' | 231 |

The actual memory location is determined by adding the Offset to the starting Storage Address for the Level Range. For example the RIGHT Input Data Buffer Count is located in 'X' 00C0 + 003D or in 'X' 00FD.

FIG.7

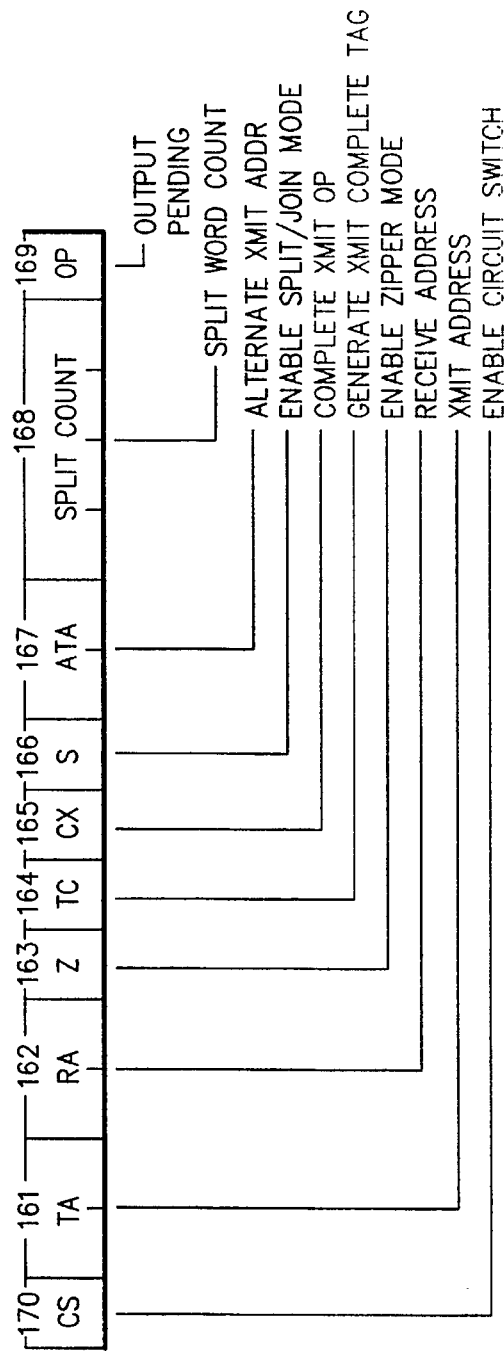
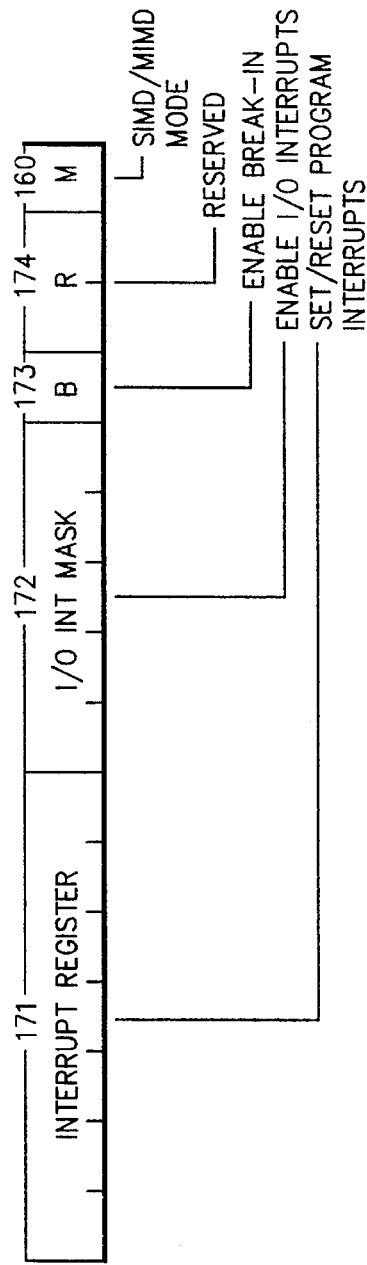
FIG.8

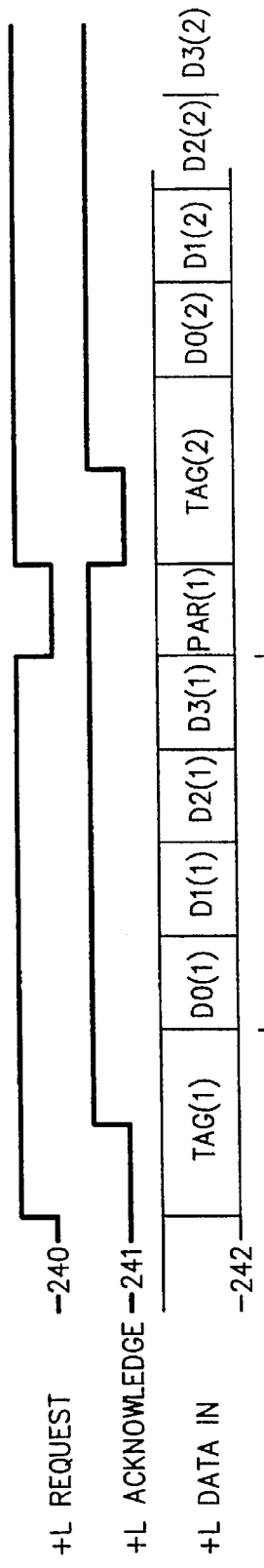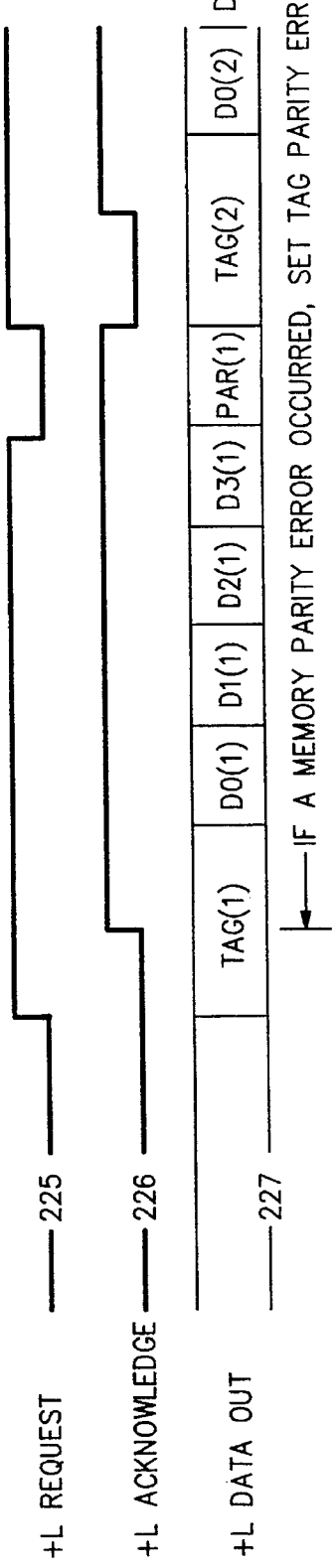

TRANSMIT REGISTER
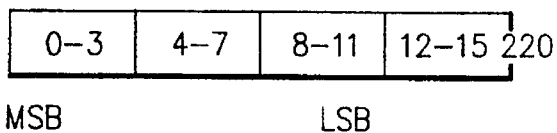
DATA TRANSFER SEQUENCE:
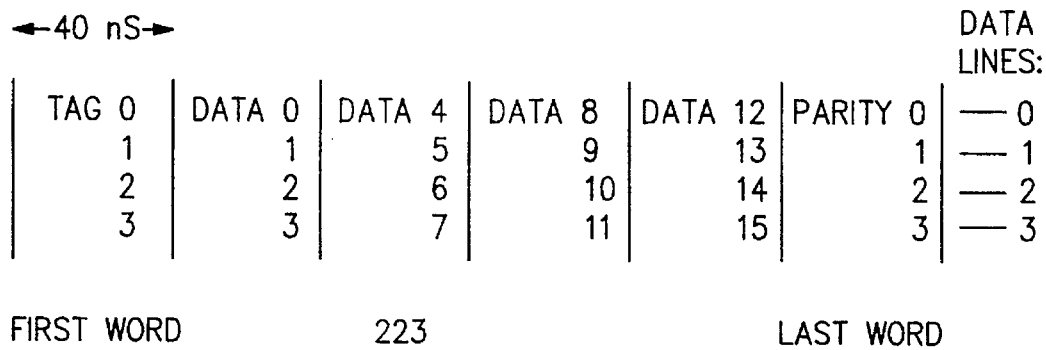
TAG:
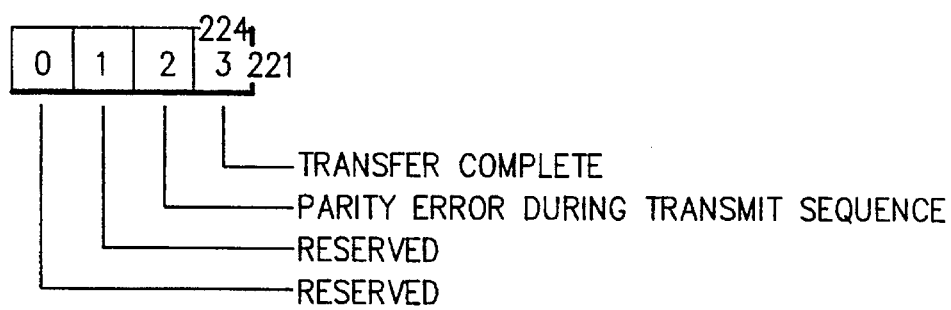
- TRANSFER COMPLETE
- PARITY ERROR DURING TRANSMIT SEQUENCE
- RESERVED
- RESERVED
PARITY:
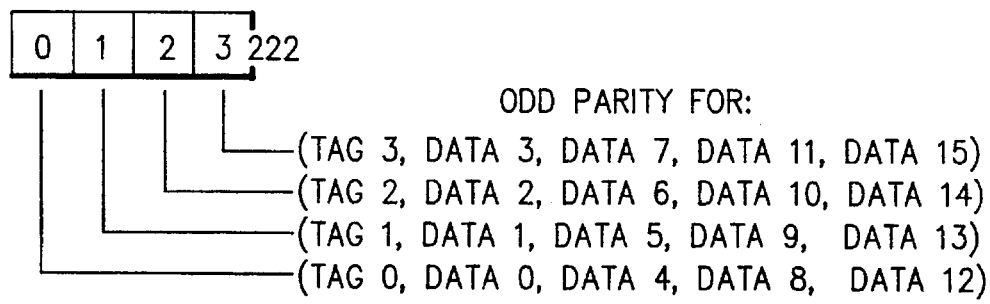
ODD PARITY FOR:
- (TAG 3, DATA 3, DATA 7, DATA 11, DATA 15)
- (TAG 2, DATA 2, DATA 6, DATA 10, DATA 14)
- (TAG 1, DATA 1, DATA 5, DATA 9, DATA 13)
- (TAG 0, DATA 0, DATA 4, DATA 8, DATA 12)
FIG.12

ADVANCED PARALLEL ARRAY PROCESSOR I/O CONNECTION

CROSS REFERENCE TO RELATED APPLICATIONS

This is a continuation of Ser. No. 07/887,259, filed on May 22, 1992, now abandoned and a CIP of U.S. patent application Ser. No. 08/301,278 filed Sep. 6, 1994, which is a continuation of application Ser. No. 611,594 filed Nov. 13, 1990, of J. Dieffenderfer et al., entitled "Parallel Associative Processor System" now abandoned; and a CIP of U.S. application Ser. No. 08/324,295, filed Oct. 17, 1994, now U.S. Pat. No. 5,475,856. U.S. Pat. No. 5,475,856 of P. Kogge entitled "Dynamic Multi-Mode Parallel Processor Array" which issued Dec. 12, 1995, which was a continuation of application Ser. No. 07/798,788 filed Nov. 27, 1991, now abandoned.

In addition, this application is related to the following applications filed concurrently herewith:

U.S. patent application Ser. No. 08/558,763 filed Nov. 15, 1995, which is a continuation of application Ser. No. 08/356, 039 filed Dec. 14, 1994, which was a continuation of application Ser. No. 08/274,127 filed Jul. 12, 1994, which was a continuation of application Ser. No. 07/887,718 filed May 22, 1992, of P. Wilkinson et al., entitled "SIMIMD Array Processing System";

U.S. patent application Ser. No. 08/450,515 filed Jun. 1, 1995, which is a continuation of application Ser. No. 07/887, 514 filed May 22, 1992, of P. Wilkinson et al., entitled "Floating Point For A SIMD Array Machine";

U.S. patent application Ser. No. 08/431,617 filed May 1, 1995, which is a continuation of application Ser. No. 07/887, 455 filed May 22, 1992, of P. Wilkinson et al., entitled "Array Processor Having Grouping of SIMID Pickets";

U.S. patent application Ser. No. 08/458,859 filed Jun. 1 1995, which is a continuation of application Ser. No. 07/887, 456 filed May 22, 1992, of P. Wilkinson et el., entitled "Slide Network For An Array Processor";

U.S. patent application Ser. No. 08/430,931 filed Jun. 7, 1995, which is a continuation of application Ser. No. 07/887, 256 filed May 22, 1992, of P. Wilkinson et el., entitled "Picket Autonomy On A SIMD Machine";

U.S. patent application Ser. No. 08/292,943 filed Aug. 18, 1994, which is a continuation of application Ser. No. 07/887, 459 filed May 22, 1992, of P. Wilkinson et el., entitled "Controller For A SIMD/MIMD Processor Array"; and U.S. patent application Ser. No. 08/430,708 filed Apr. 27, 1995, which is a continuation of application Ser. No. 07/887, 997 filed May 22, 1992, of P. Wilkinson et al., entitled "Array Processor Dotted Communication Network Based On H-DOTS".

Further this application is related to:

U.S. patent application Ser. No. 07/887,630 filed May 22, 1992, of T. Barker, et al., entitled "Advanced Parallel Array Processor";

U.S. patent application Ser. No. 08/459,374 filed Jun. 2, 1995, which is a continuation of application Ser. No. 07/888, 000 filed May 22, 1992, of T. Barker, entitled "SIMD/MIMD Processing Memory Element";

U.S. patent application Ser. No. 08/459,380 filed Jun. 2 1995, which is a continuation of application Ser. No. 07/993, 255 filed Dec. 18, 1992, of T. Barker, entitled "PME Store and Forward/Circuit Switched Mode";

U.S. patent application Ser. No. 08/468,500 filed Jun. 6, 1995, which is a continuation of application Ser. No. 07/887, 508 filed May 22, 1992, of T. Barker, entitled "Fully Distributed Processing Memory Element";

U.S. patent application Ser. No. 08/519,859 filed Aug. 25, 1995, which is a continuation of application Ser. No. 08/380, 230 filed Jan. 30, 1995, which was a continuation of application Ser. No. 07/877,612 filed May 22, 1992, of M. Dapp, et al., entitled "Advanced Parallel Processor Including Advanced Support Hardware";

U.S. patent application Ser. No. 08/412,025 filed Mar. 28, 1995 which is a continuation of application Ser. No. 07/587, 512 filed May 22, 1992, of M. Dapp, et al., entitled "Advanced Parallel Array Processor Computer Package";

U.S. patent application Ser. No. 08/282,101 filed Jul. 28, 1994, which is a continuation of application Ser. No. 07/888, 684 filed May 22, 1992, of T. Barker et al., entitled "N-Dimensional Modified Hypercube"; and U.S. patent application Ser. No. 08/430,114 filed Apr. 27, 1995, which is a continuation of application Ser. No. 887, 258 filed May 22, 1992, of M. Dapp, et al., entitled "APAP I/O Programmable Router".

These co-pending applications and the present application are owned by one and the same assignee, International Business Machines Corporation of Armonk, New York. The descriptions set forth in these co-pending applications are incorporated into the present application by reference.

Cross Reference to Other Patents and Co-Pending Patent Applications

Other commonly owned patents and co-pending patent applications also assigned to the same assignee as the present application at the time of filing include:

U.S. Pat. No. 4,992,933 of J. Taylor entitled "SIMD Array Processor With Global Instruction Control and Reprogrammable Instruction Decoders" which issued Feb. 12, 1991;

U.S. Pat. No. 5,257,395 of H. Li entitled "Methods And Circuit For Implementing An Arbitrary Graph On A Polymorphic Mesh" which issued Oct. 26, 1993;

U.S. Pat. No. 5,410,727 of R. Jaffe et al. entitled "Input/Output System For A Massively Parallel, Single Instruction, Multiple Data (SIMD) Computer Providing For The Simultaneous Transfer Of Data Between A Host Computer Input/Output System And All SIMD Memory Devices" which issued on Apr. 25, 1995;

U.S. Pat. No. 5,457,789 of W. Dietrich, Jr. et al. entitled "Method and Apparatus For Performing Memory Protection Operations In A Single Instruction, Multiple Data System" which issued Oct. 10, 1995; and U.S. Pat. No. 5,313,645 of D. Rolfe entitled "Method For Interconnecting And System Of Interconnected Processing Elements By Controlling Network Density" which issued May 17, 1994.

All above referenced co-pending applications are also are owned by one and the same assignee, namely, International Business Machines Corporation of Armonk, New York.

The descriptions set forth in these co-pending applications are also incorporated by reference.

FIELD OF THE INVENTION

These invention relate to fine-grained parallel processors and architectures and particularly to passing data into and out of the array of processing elements.

GLOSSARY OF TERMS

ALU

ALU is the arithmetic logic unit portion of a processor.

Array

Array refers to an arrangement of elements in one or more dimensions. An array can include an ordered set of data items (array element) which in languages like Fortran are identified by a single name. In other languages such a name of an ordered set of data items refers to an ordered collection or set of data elements, all of which have identical attributes. A program array has dimensions specified, generally by a number or dimension attribute. The declarator of the array may also specify the size of each dimension of the array in some languages. In some languages, an array is an arrangement of elements in a table. In a hardware sense, an array is a collection of structures (functional elements) which are generally identical in a massively parallel architecture. Array elements in data parallel computing are elements which can be assigned operations and when parallel can each independently and in parallel execute the operations required. Generally, arrays may be thought of as grids of processing elements. Sections of the array may be assigned sectional data, so that sectional data can be moved around in a regular grid pattern. However, data can be indexed or assigned to an arbitrary location in an array.

Array Director

An Array Director is a unit programmed as a controller for an array. It performs the function of a master controller for a grouping of functional elements arranged in an array.

Array Processor There two principal types of array processors—multiple instruction multiple data (MIMD) and single instruction multiple data (SIMD). In a MIMD array processor, each processing element in the array executes its own unique instruction stream with its own data. In a SIMD array processor, each processing element in the array is restricted to the same instruction via a common instruction stream; however, the data associated with each processing element is unique. Our preferred array processor has other characteristics. We call it Advanced Parallel Array Processor, and use the acronym APAP.

Asynchronous

Asynchronous is without a regular time relationship; the execution of a function is unpredictable with respect to the execution of other functions which occur without a regular or predictable time relationship to other function executions. In control situations, a controller will address a location to which control is passed when data is waiting for an idle element being addressed. This permits operations to remain in a sequence while they are out of time coincidence with any event.

BOPS/GOPS

BOPS or GOPS are acronyms having the same meaning—billions of operations per second. See GOPS.

Circuit Switched/Store Forward

These terms refer to two mechanisms for moving data packets through a network of nodes. Store Forward is a mechanism whereby a data packet is received by each intermediate node, stored into its memory, and then forwarded on towards its destination. Circuit Switch is a mechanism whereby an intermediate node is commanded to logically connect its input port to an output port such that data packets can pass directly through the node towards their destination, without entering the intermediate node's memory.

Cluster

A cluster is a station (or functional unit) which consists of a control unit (cluster controller) and the hardware (which may be terminals, functional units, or virtual components) attached to it. Our Cluster includes an array of PMEs sometimes called a Node array. Usually a cluster has 512 PMEs.

Our Entire PME node array consists of a set of clusters, each cluster supported by a cluster controller (CC).

Cluster Controller

A cluster controller is a device that controls input/output (I/O) operations for more than one device or functional unit connected to it. A cluster controller is usually controlled by a program stored and executed in the unit as it was in the IBM 3601 Finance Communication Controller, but it can be entirely controlled by hardware as it was in the IBM 3272 Control Unit.

Cluster Synchronizer

A cluster synchronizer is a functional unit which manages the operations of all or part of a cluster to maintain synchronous operation of the elements so that the functional units maintain a particular time relationship with the execution of a program.

Controller

A controller is a device that directs the transmission of data and instructions over the links of an interconnection network; its operation is controlled by a program executed by a processor to which the controller is connected or by a program executed within the device.

CMOS

CMOS is an acronym for Complementary Metal-Oxide Semiconductor technology. It is commonly used to manufacture dynamic random access memories (DRAMs). NMOS is another technology used to manufacture DRAMS. We prefer CMOS but the technology used to manufacture the APAP is not intended to limit the scope of the semiconductor technology which is employed.

Dotting

Dotting refers to the joining of three or more leads by physically connecting them together. Most backpanel busses share this connection approach. The term relates to OR DOTS of times past but is used here to identify multiple data sources that can be combined onto a bus by a very simple protocol.

Our I/O zipper concept can be used to implement the concept that the port into a node could be driven by the port out of a node or by data coming from the system bus. Conversely, data being put out of a node would be available to both the input to another node and to the system bus. Note that outputting data to both the system bus and another node is not done simultaneously but in different cycles.

Dotting is used in the H-DOT discussions where Two-ported PMEs or Pickets can be used in arrays of various organizations by taking advantage of dotting. Several topologies are discussed including 2 D and 3 D Meshes, Base 2 N-cube, Sparse Base 4 N-cube, and Sparse Base 8 N-cube.

DRAM

DRAM is an acronym for dynamic random access memory, the common storage used by computers for main memory. However, the term DRAM can be applied to use as a cache or as a memory which is not the main memory.

FLOATING-POINT

A floating-point number is expressed in two parts. There is a fixed point or fraction part, and an exponent part to some assumed radix or Base. The exponent indicates the actual placement of the decimal point. In the typical floating-point representation a real number 0.0001234 is represented as 0.1234-3, where 0.1234 is the fixed-point part and -3 is the exponent. In this example, the floating-point radix or base is 10, where 10 represents the implicit fixed positive integer base, greater than unity, that is raised to the power explicitly denoted by the exponent in the floating-point representation or represented by the characteristic in the floating-point representation and then multiplied by the fixed-point part to determine the real number represented. Numeric literals can be expressed in floating-point notation as well as real numbers.

FLOPS

This terms refers to floating-point instructions per second. Floating-point operations include ADD, SUB, MPY, DIV and often many others. Floating-point instructions per second parameter is often calculated using the add or multiply instructions and, in general, may be considered to have a 50/50 mix. An operation includes the generation of exponent, fraction and any required fraction normalization. We could address 32 or 48-bit floating-point formats (or longer but we have not counted them in the mix.) A floating-point operation when implemented with fixed point instructions (normal or RISC) requires multiple instructions. Some use a 10 to 1 ratio in figuring performance while some specific studies have shown a ratio of 6.25 more appropriate to use. Various architectures will have different ratios.

Functional Unit

A functional unit is an entity of hardware, software, or both, capable of accomplishing a purpose.

Gbytes

Gbytes refers to a billion bytes. Gbytes/s would be a billion bytes per second.

GIGAFLOPS $(10)^{**}9$ floating-point instructions per second.

GOPS and PETAOPS

GOPS or BOPS, have the same meaning—billions of operations per second. PETAOPS means trillions of operations per second, a potential of the current machine. For our APAP machine they are just about the same as BIPs/GIPs meaning billions of instructions per second. In some machines an instruction can cause two or more operations (ie. both an add and multiply) but we don't do that. Alternatively it could take many instructions to do an op. For example we use multiple instructions to perform 64 bit arithmetic. In counting ops however, we did not elect to count log ops. GOPS may be the preferred use to describe performance, but there is no consistency in usage that has been noted. One sees MIPs/MOPs then BIPs/BOPs and MegaFLOPS/GigaFLOPS/TeraFLOPS/PetaFlops.

ISA

ISA means the Instruction Set Architecture.

Link

A link is an element which may be physical or logical. A physical link is the physical connection for joining elements or units, while in computer programming a link is an instruction or address that passes control and parameters between separate portions of the program. In multisystems a link is the connection between two systems which may be specified by program code identifying the link which may be identified by a real or virtual address. Thus generally a link includes the physical medium, any protocol, and associated devices and programming; it is both logical and physical.

MFLOPS

MFLOPS means $(10)^{**}6$ floating-point instructions per second.

MIMD

MIMD is used to refer to a processor array architecture wherein each processor in the array has its own instruction stream, thus Multiple Instruction stream, to execute Multiple Data streams located one per processing element.

Module

A module is a program unit that is discrete and identifiable or a functional unit of hardware designed for use with other components. Also, a collection of PEs contained in a single electronic chip is called a module.

Node

Generally, a node is the junction of links. In a generic array of PMEs, one PMEs can be a node. A node can also contain a collection of PMEs called a module. In accordance with our invention a node is formed of an array of PMEs, and we refer to the set of PMEs as a node. Preferably a node is 8 PMEs.

Node array

A collection of modules made up of PMEs is sometimes referred to as a node array, is an array of nodes made up of modules. A node array is usually more than a few PMEs, but the term encompasses a plurality.

PDE

A PDE is a partial differential equation.

PDE Relaxation Solution Process

PDE relaxation solution process is a way to solve a PDE (partial differential equation). Solving PDEs uses most of the super computing compute power in the known universe and can therefore be a good example of the relaxation process. There are many ways to solve the PDE equation and more than one of the numerical methods includes the relaxation process. For example, if a PDE is solved by finite element methods relaxation consumes the bulk of the computing time. Consider an example from the world of heat transfer. Given hot gas inside a chimney and a cold wind outside, how will the temperature gradient within the chimney bricks develop? By considering the bricks as tiny segments and writing an equation that says how heat flows between segments as a function of temperature differences then the heat transfer PDE has been converted into a finite element problem. If we then say all elements except those on the inside and outside are at room temperature while the boundary segments are at the hot gas and cold wind temperature, we have set up the problem to begin relaxation. The computer program then models time by updating the temperature variable in each segment based upon the amount of heat that flows into or out of the segment. It takes many cycles of processing all the segments in the model before the set of temperature variables across the chimney relaxes to represent actual temperature distribution that would occur in the physical chimney. If the objective was to model gas cooling in the chimney then the elements would have to extend to gas equations, and the boundary conditions on the inside would be linked to another finite element model, and the process continues. Note that the heat flow is dependent upon the temperature difference between the segment and its neighbors. It thus uses the inter-PME communication paths to distribute the temperature variables. It is this near neighbor communication pattern or characteristic that makes PDE relation very applicable to parallel computing.

PICKET

This is the element in an array of elements making up an array processor. It consists of: data flow (ALU REGS), memory, control, and the portion of the communication matrix associated with the element. The unit refers to a 1/nth of an array processor made up of parallel processor and memory elements with their control and portion of the array intercommunication mechanism. A picket is a form of processor memory element or PME. Our PME chip design processor logic can implement the picket logic described in related applications or have the logic for the array of processors formed as a node. The term PICKET is similar to the commonly used array term PME for processor memory element, and is an element of the processing array preferably comprised of a combined processing element and local memory for processing bit parallel bytes of information in a clock cycle. The preferred embodiment consisting of a byte wide data flow processor, 32k bytes or more of memory, primitive controls and ties to communications with other pickets.

The term "picket" comes from Tom Sawyer and his white fence, although it will also be understood functionally that a military picket line analogy fits quite well.

Picket Chip

A picket chip contains a plurality of pickets on a single silicon chip.

Picket Processor System (or Subsystem)

A picket processor is a total system consisting of an array of pickets, a communication network, an I/O system, and a SIMD controller consisting of a microprocessor, a canned routine processor, and a micro-controller that runs the array.

Picket Architecture

The Picket Architecture is the preferred embodiment for the SIMD architecture with features that accommodate several diverse kinds of problems including:

set associative processing parallel numerically intensive processing physical array processing similar to images Picket Array A picket array is a collection of pickets arranged in a geometric order, a regular array.

PME or Processor Memory Element

PME is used for a processor memory element. We use the term PME to refer to a single processor, memory and I/O capable system element or unit that forms one of our parallel array processors. A processor memory element is a term which encompasses a picket. A processor memory element is 1/nth of a processor array which comprises a processor, its associated memory, control interface, and a portion of an array communication network mechanism. This element can have a processor memory element with a connectivity of a regular array, as in a picket processor, or as part of a subarray, as in the multi-processor memory element node we have described.

Routing

Routing is the assignment of a physical path by which a message will reach its destination. Routing assignments have a source or origin and a destination. These elements or addresses have a temporary relationship or affinity. Often, message routing is based upon a key which is obtained by reference to a table of assignments. In a network, a destination is any station or network addressable unit addressed as the destination of information transmitted by a path control address that identifies the link. The destination field identifies the destination with a message header destination code.

SIMD

A processor array architecture wherein all processors in the array are commanded from a Single Instruction stream to execute Multiple Data streams located one per processing element.

SIMDMIMD or SIMD/MIMD

SIMDMIMD or SIMD/MIMD is a term referring to a machine that has a dual function that can switch from MIMD to SIMD for a period of time to handle some complex instruction, and thus has two modes. The Thinking Machines, Inc. Connection Machine model CM-2 when placed as a front end or back end of a MIMD machine permitted programmers to operate different modes for execution of different parts of a problem, referred to sometimes a dual modes. These machines have existed since Illiac and have employed a bus that interconnects the master CPU with other processors. The master control processor would have the capability of interrupting the processing of other CPUs. The other CPUs could run independent program code. During an interruption, some provision must be made for checkpointing (closing and saving current status of the controlled processors).

SIMIMD

SIMIMD is a processor array architecture wherein all processors in the array are commanded from a Single Instruction stream, to execute Multiple Data streams located one per processing element. Within this construct, data dependent operations within each picket that mimic instruction execution are controlled by the SIMD instruction stream.

This is a Single Instruction Stream machine with the ability to sequence Multiple Instruction streams (one per Picket) using the SIMD instruction stream and operate on Multiple Data Streams (one per Picket). SIMIMD can be executed by a processor memory element system.

SISD

SISD is an acronym for Single Instruction Single Data.

Swapping

Swapping interchanges the data content of a storage area with that of another area of storage.

Synchronous Operation

Synchronous operation in a MIMD machine is a mode of operation in which each action is related to an event (usually a clock); it can be a specified event that occurs regularly in a program sequence. An operation is dispatched to a number of PMEs who then go off to independently perform the function. Control is not returned to the controller until the operation is completed.

If the request is to an array of functional units, the request is generated by a controller to elements in the array which must complete their operation before control is returned to the controller.

TERAFLOPS

TERAFLOPS means (10)**12 floating-point instructions per second.

VLSI

VLSI is an acronym for very large scale integration (as applied to integrated circuits).

Zipper

A zipper is a new function provided. It allows for links to be made from devices which are external to the normal interconnection of an array configuration.

Circuit Switched—Method of data transfer between PMEs in the array wherein intermediate PMEs logically connect an input port to an output port such that messages pass through the intermediate PME towards the ultimate destination without additional handling by the intermediate PME.

Input Transfer Complete Interrupt—Request for program context switch which occurs when an I/O message word is received which is accompanied by a Transfer Complete tag.

Break-in—A mechanism whereby an I/O port causes a processor transparent context switch and uses processor data flow and control paths to self-manage data transfers.

Runtime Software—Software which executes on a processing element. It includes operating systems, executive programs, application programs, service programs, etc.

Memory Refresh—A required function of a Dynamic RAM technology in which use of the memory is suspended while the current information is rewritten.

Zipper—A dynamic breaking of a group of network rings. When it is "zipped," data can traverse the rings without entering or leaving the network. When it is "unzipped," the rings are broken, forming an edge to the network through which data traversing the rings enter or leave the network.

BACKGROUND OF THE INVENTION

As background for our invention of our invention, fast I/O in mesh, tori, and other dimensional networks would be enhanced by a faster I/O. Prior systems do not have our features for networks. We believe it important to have a facility to break rings forming an edge to the network through which data traversing the rings enter or leave the network.

SUMMARY OF THE INVENTION

A fast I/O for a multi-PME computer system provides a way to break into a network coupling to alternate network couplings. The system coupling is called a zipper.

Our I/O zipper concept can be used to implement the concept that the port into a node could be driven by the port out of a node or by data coming from the system bus. Conversely, data being put out of a node would be available to both the input to another node and to the system bus. Outputting data to both the system bus and another node is not done simultaneously but in different cycles. The zipper passes data into and out of a network of interconnected nodes is used in a system of interconnecting nodes in a mesh, rings of wrapped tori. such that there is no edge to the network, the zipper mechanism logically breaks the the rings along a dimension orthogonal to the rings such that an edge to the network is established. The coupling dynamically toggles the network between a network without an edge and a network with an edge. Data passes into the network or out of the network through the edge when it is active, and the coupling permits dispersal of data entering the network or collection of data leaving the network such that the data rate through the edge matches both the sustained and peak data rates of the system external to the network.

A zipper permits a dynamic breaking of a group of network rings. When it is "zipped," data can traverse the rings without entering or leaving the network. When it is "unzipped," the rings are broken, forming an edge to the network through which data traversing the rings enter or leave the network.

These and other improvements are set forth in the following detailed description. For a better understanding of the invention with advantages and features, refer to the description and to the drawings.

BRIEF DESCRIPTION OF THE DRAWINGS

FIG. 7 is a schematic illustrative of the reserved storage locations for interrupts and I/O processing.

FIG. 8 is a schematic illustrative of the PME Control Registers which support the implementation of interrupts and interconnection network.

FIG. 10 is a schematic illustrative of the input interface sequencing between PME I/Os.

FIG. 12 is a schematic illustrative of the Tag, Parity, and Data words transferred between PME I/Os.

FIG. 15 is a schematic illustrative of the output interface sequencing between PME I/Os.

Our detailed description explains the preferred embodiments of our invention, together with advantages and features, by way of example with reference to the following drawings.

The Preferred Embodiment

Prior patent application, U.S. Ser. No. 611,594, entitled "Parallel Associative Processor System," describes the idea of integrating computer memory and control logic within a single chip, replicating the combination within the chip and building a processor system out of replications of the single chip. This approach leads to a system which provides massively parallel processing capability at the cost of developing and manufacturing only a single chip type while enhancing performance capability by reducing the chip boundary crossings and line length.

The original patent described utilization of 1-dimensional I/O structures with multiple SIMD Processing Memory Elements (PMEs) attached to that structure within the chip. This application and the referenced related applications extend that concept to dimensions greater than one and includes a full I/O system with both data transfer and program interrupts. The description which follows will be in terms of 4-dimensional I/O structures with 8 SIMD/MIMD PMEs per chip; however that can be extended to greater dimensionality or more PMEs per dimension as described in U.S. Ser. No. 611,594.

This application and its related applications extend the concepts from the interprocessor communication to the external Input/Output facilities. Additionally, it describes the interfaces and elements required to control the processing array. In summary, three types of I/O are described: (a) Inter-processor, (b) Processors to/from external, and (c) Broadcast/control. Massively parallel processing systems require all these types of I/O bandwidth demands to be balanced with processor computing capability. Within the array these requirements will be satisfied by replicating a 16-bit instruction set architecture computer that is augmented with very fast interrupt state swapping capability and is referred to as the PME in subsequent text. The characteristics of the PME are unique when compared with the processing elements on other massively parallel machines. It permits the processing, routing, storage and I/O to be completely distributed. This is not characteristic of any other design.

Figure 1:
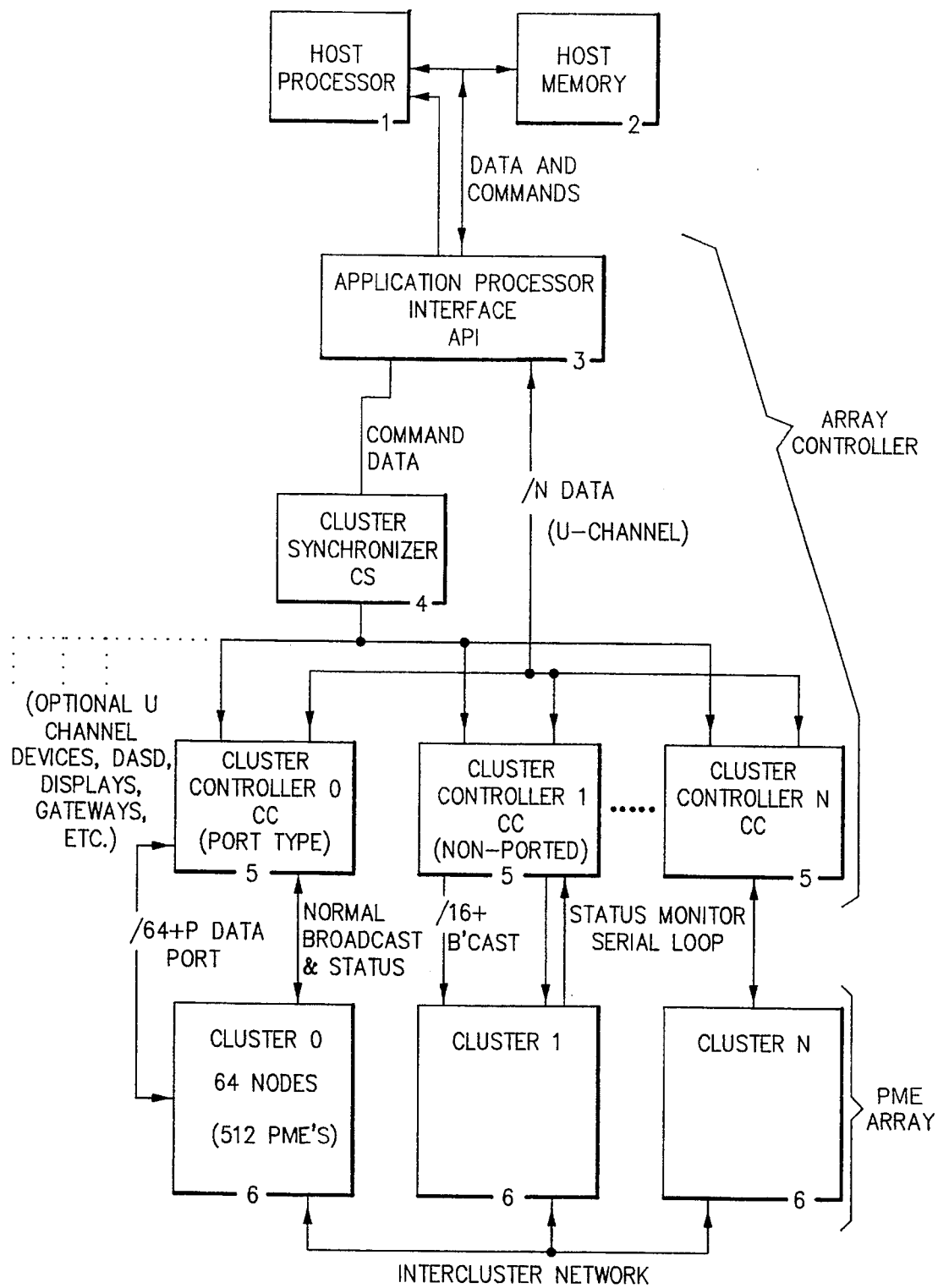
FIG. 1 is a functional block diagram illustrative of a typical Advanced Parallel Array Processor (APAP) particularly showing the major elements of the APAP, and the APAP Interface to a Host Processor or other data source/destination.

The block diagram for the "Advanced Parallel Array Processor (APAP)", discosed in detail in the referenced application above is shown in FIG. 1. The APAP is an adjunct to a host processor 1. Data and commands are issued by the program executing on the host processor. These data and commands are received and translated in the Application Program Interface (API) 3 of the Array Director. The API then passes data and commands through the Cluster Synchronizer 4 and Cluster Controllers 5 to the Clusters 6. The clusters provide the memory and parallel processing of the APAP. The functions provided by the cluster synchronizer and cluster controllers are to route the data and commands to the proper cluster and to provide load balancing among the clusters. More details of the controller are described in the "Advanced Parallel Processor Array Director" application refered to above.

The cluster consists of a number of PMEs that are interconnected as a modified hypercube. In a hypercube, each cell can address as its neighbor any cell whose address differs in any single-bit position. In a ring any cell can address as its neighbor the two cells whose addresses differ ±1. The modified hypercubes utilized for the APAP combine these approaches by building hypercubes out of rings. The intersection of rings is defined to be a node. The node, in our preferred embodiment, comprises 2n PMEs 20 plus the Broadcast and Control Interface (BCI) 21 section. The PMEs are configured within the node as a 2 by n array where "n" represents the number of dimensions, or rings, which characterize the array and is limited by the physical chip package; for the preferred embodiment, n=4. As chip technology improves, increasing "n" will allow increased dimensionality in the array.

Figure 3A:
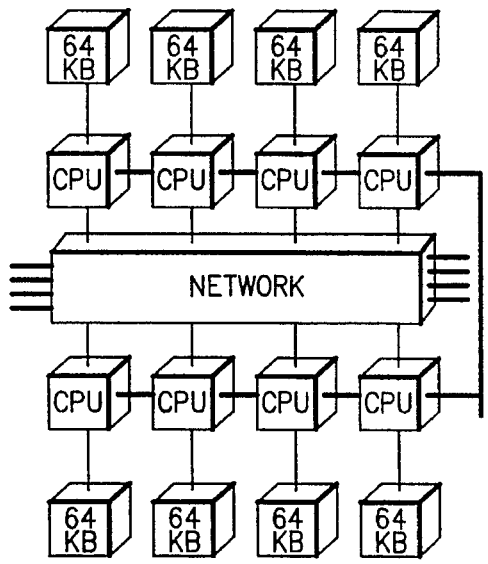
FIGS. 3A and 3B are schematics illustrative of the modified binary hypercube.
Figure 3B:
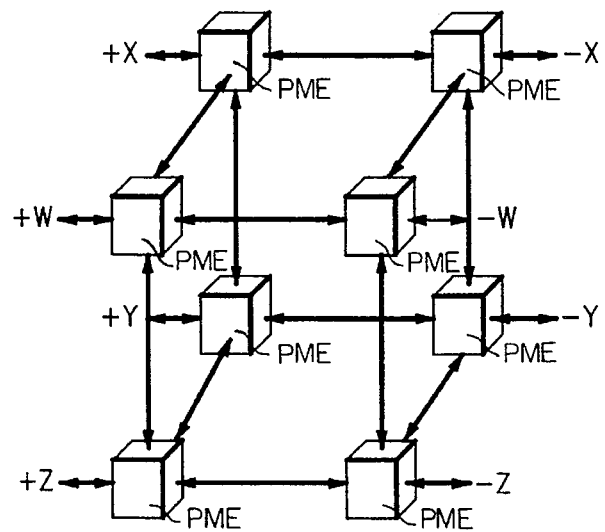

FIG. 3 shows the buildup from the PME to the array. Eight PMEs are interconnected to form a node 151. A group of eight nodes are interconnected in the X dimension rings (16 PMEs) and an overlapping group of eight nodes is interconnected in the Y dimension rings 152. This yields a single two dimensional cluster with an 8×8 array of nodes (512 PMEs). Clusters are combined in up to an 8×8 array to form a four dimensional array element by adding dimensions W, X, and Z denoted as elements 153 in FIG. 3B. Every group of eight nodes across the array element is interconnected in both the W dimension and Z dimension. The interconnection paths for a single node in all four dimensions are shown 154. Note that it is not necessary that the array be either regular or orthogonal. Particular applications or configurations could redefine the number of nodes in any or all dimensions.

Figure 2:
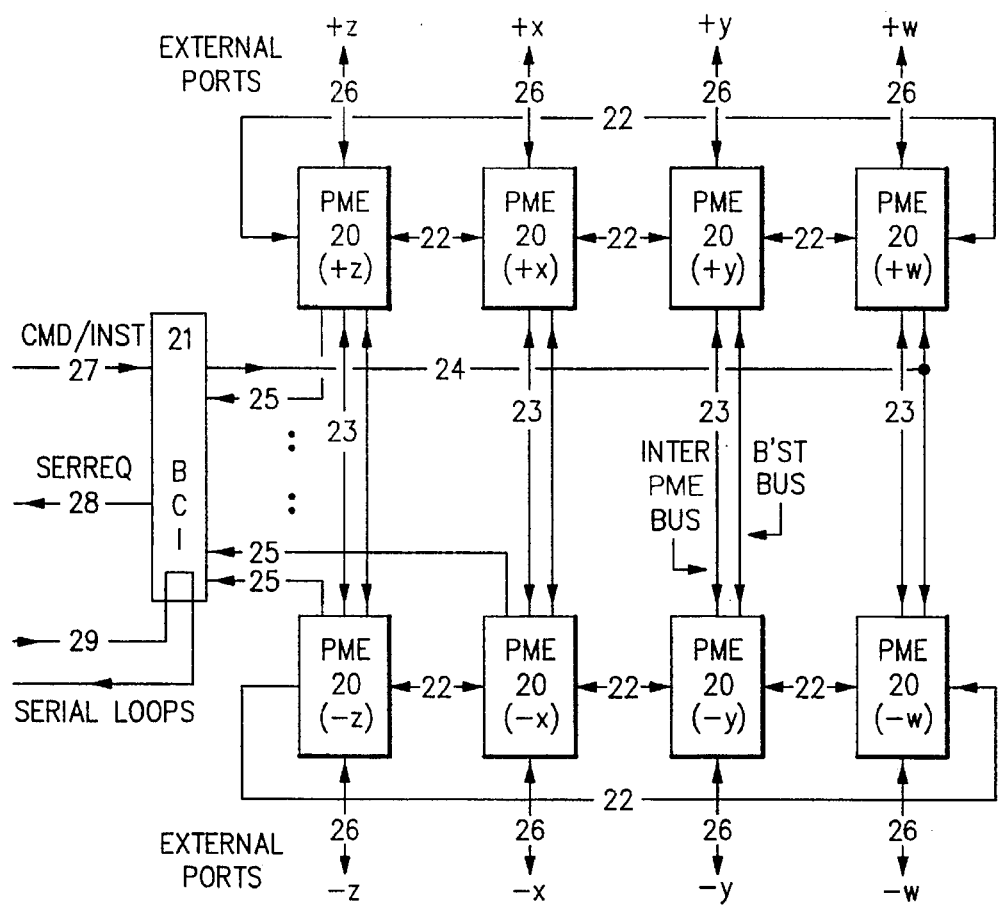
FIG. 2 is a schematic illustrative of the embodiment of the Processing Memory Element Node and particularly shows the interconnection of the various elements which make up the Node.

Each PME exists in only one ring of nodes 26 (FIG. 2). The rings are denoted W, X, Y, and Z. PMEs 20 within a chip are paired (i.e. +W,−W) such that one moves data externally clockwise along a ring of nodes, and the other moves data externally counterclockwise along the ring of nodes 23,26, thus dedicating a PME to each node external port. The two PMEs in each ring are designated by their external I/O port (+W,−W, +X,−X, +Y,−Y, +Z,−Z). Within the node, there are also two rings 22 which interconnect the 4+n and the 4−n PMEs. These internal rings provide the path for messages to move between the external rings. Since the APAP can be considered a four-dimensional orthogonal array 151–154 (FIGS. 3A and 3B), the internal rings allow messages to move through the array in all dimensions. This leads to the addressing structure where any PME can step messages toward the objective by addressing a PME in its own ring of nodes or an adjacent PME within its node.

Figure 4:
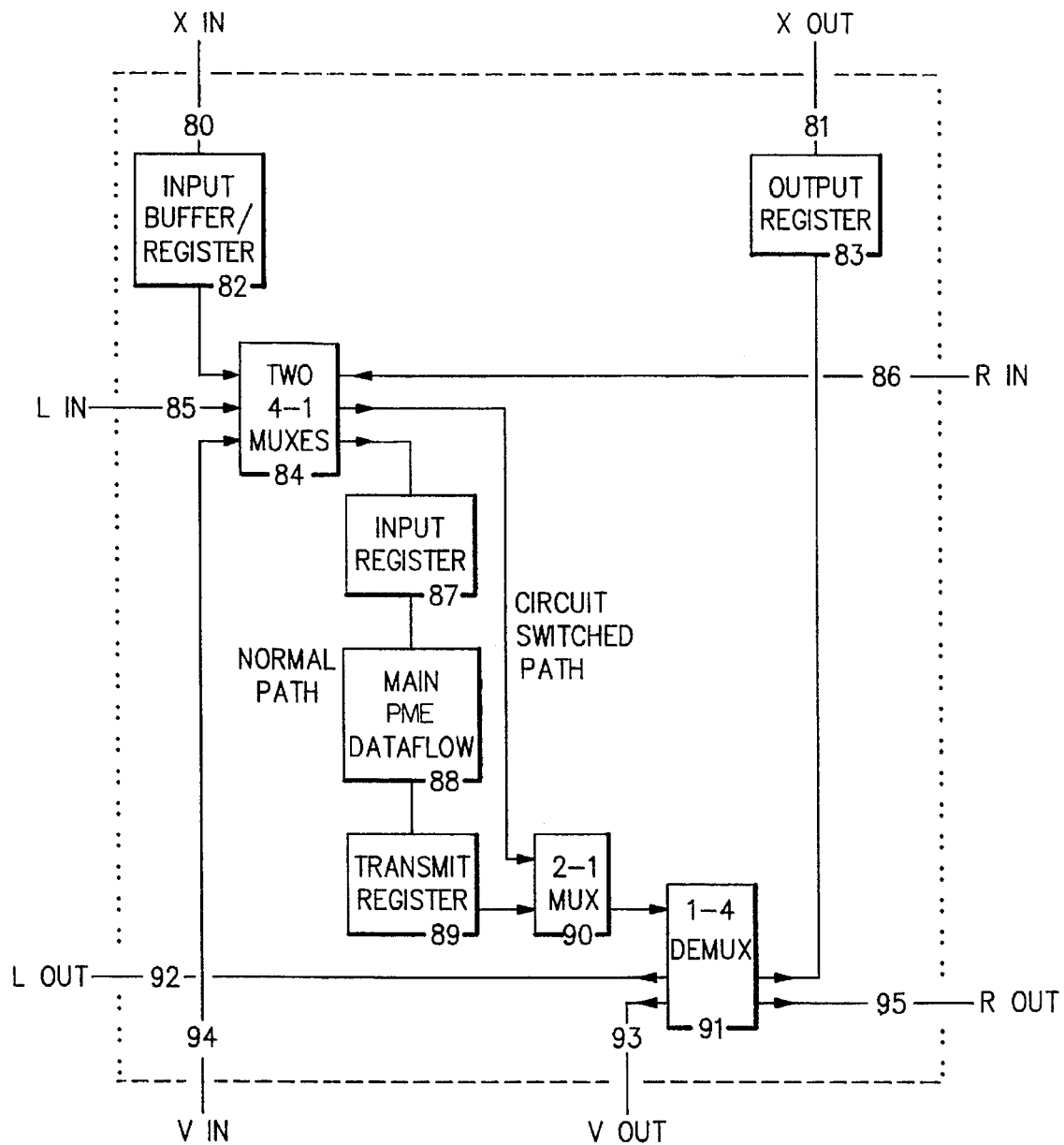
FIG. 4 is a schematic illustrative of the the circuit switch path.
Figure 14:
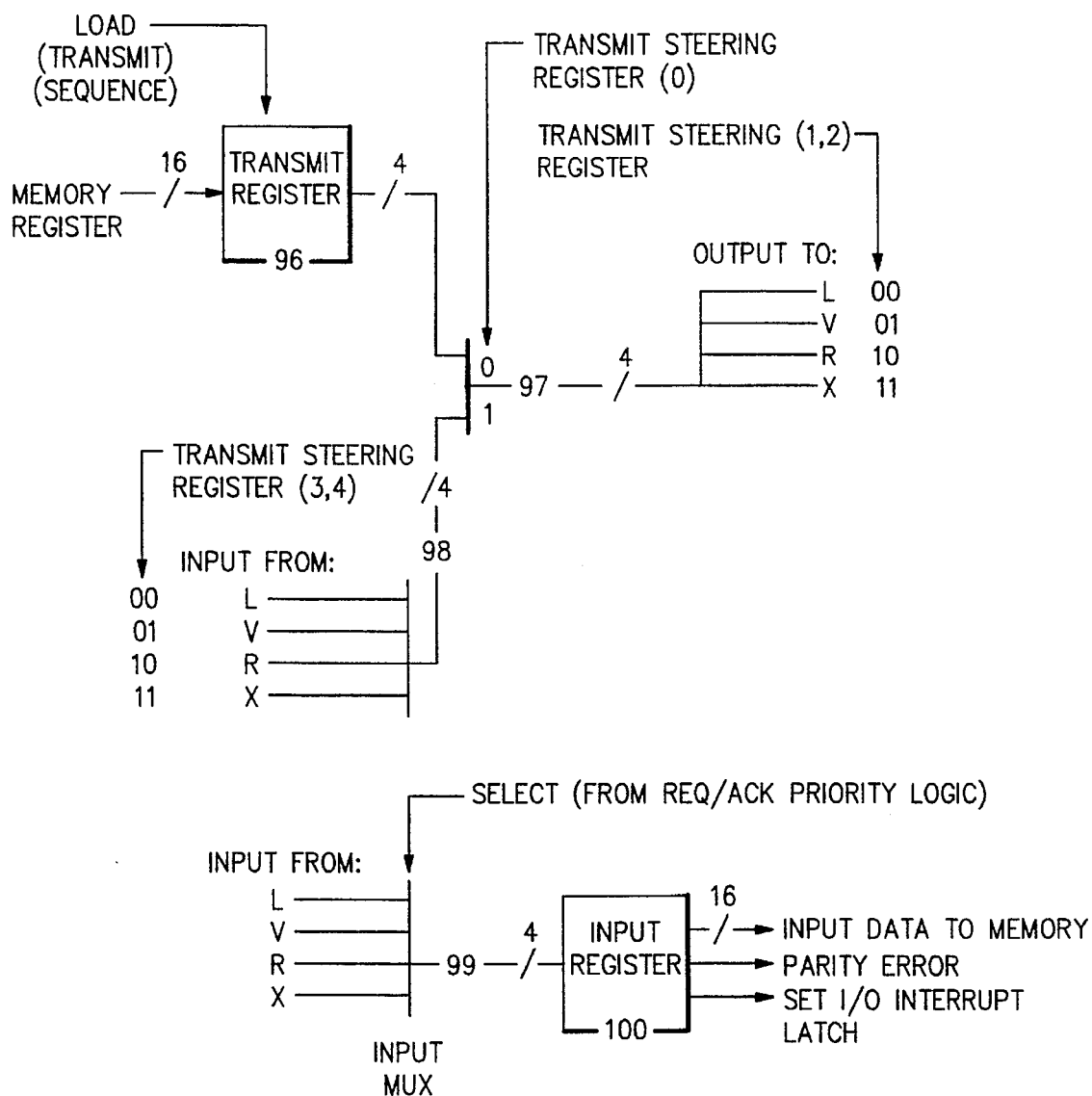
FIG. 14 is a schematic illustrative of the the PME I/O data flow.

Each PME has 4 input ports and 4 output ports (Left 85,92, Right 86,95, Vertical 93,94, and External 80,81) in FIG. 4. Three of the input ports and three of the output ports are full duplex point-to-point connections to other PMEs on the chip. The fourth port provides a full duplex point-to-point connection to an off-chip PME. Due to pin and power constraints in the physical package of the preferred implementation, the actual I/O interfaces are 4-bit wide paths 97,98,99 which are used to multiplex four nibbles of the inter-PME data word 96,100, illustrated in FIG. 14.

In the preferred embodiment, the PME I/O design provides three I/O operating modes:

Normal Mode—Used to transfer data between two adjacent PMEs. Data transfer is initiated by the PME software. Data destined for a PME further than the adjacent PME must be received by the adjacent PME and then sent on as if it originated in the adjacent PME. Normal mode is shown in detail in the co-pending application entitled "PME Store and Forward/Circuit Switched Modes."

Circuit Switched Mode—Allows data and controls to pass through a PME. This allows fast communication between PMEs that are not immediate neighbors. Circuit switched mode is disclosed in detail in the co-pending application entitled "PME Store and Forward/Circuit Switched Modes."

Zipper Mode—Used by the Array Controller to load or read data from the nodes in a cluster. Zipper mode uses features of the normal and circuit switched modes to rapidly transfer data into and out of the array of PMEs on a cluster card.

Figure 5:
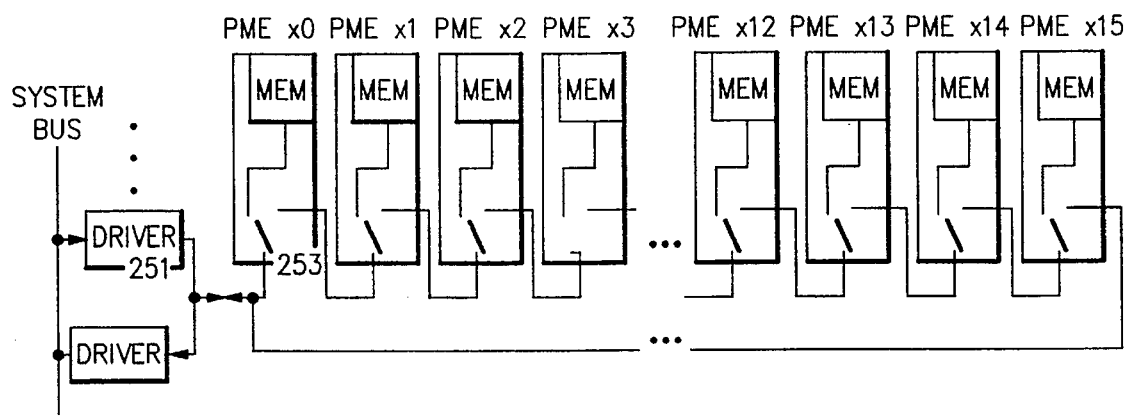
FIG. 5 is a schematic illustrative of a zipper connection on a single PME—PME interface.

Each ring within the array W, X, Y, Z is continuous; there is no "edge" to the array. Conceptually, the zipper is a logical breaking of a ring at the interface between two nodes to form a temporary edge. If the zipper is inactive, the array has no edge. When the zipper is activated, all the interfaces between two columns of nodes are broken and the resulting "edge" is used for data transfer between the array and the array controller. For example, referring to FIG. 5, there is represented 1 ring (Y=0) of 8 rings in an X-Y coordinate plane with the left most column being X=0 wherein if a zipper connection is placed on the −X interface along the X=0 column of nodes, the interface between the X=8 (PME×15) 250 column of nodes and the X=0 (PME×0) 253 column of nodes is no longer point-to-point but rather has a third (host) interface 251 attached. Normally, data passes between PME×0 253 and PME×15 250 as if the host interface were not there. However, under PME runtime software control, if the zipper is activated data is passed between the array 250,253 and the host 251 through the temporary edge of the array. A zipper along a row of a single cluster breaks the rings at eight nodes. Based on today's technology, the preferred embodiment can pass approximately 57 megabytes per second through a single zipper into/out of a single cluster. Future technology enhancements such as optical connections are expected to provide significant increases in this data rate.

Figure 6:
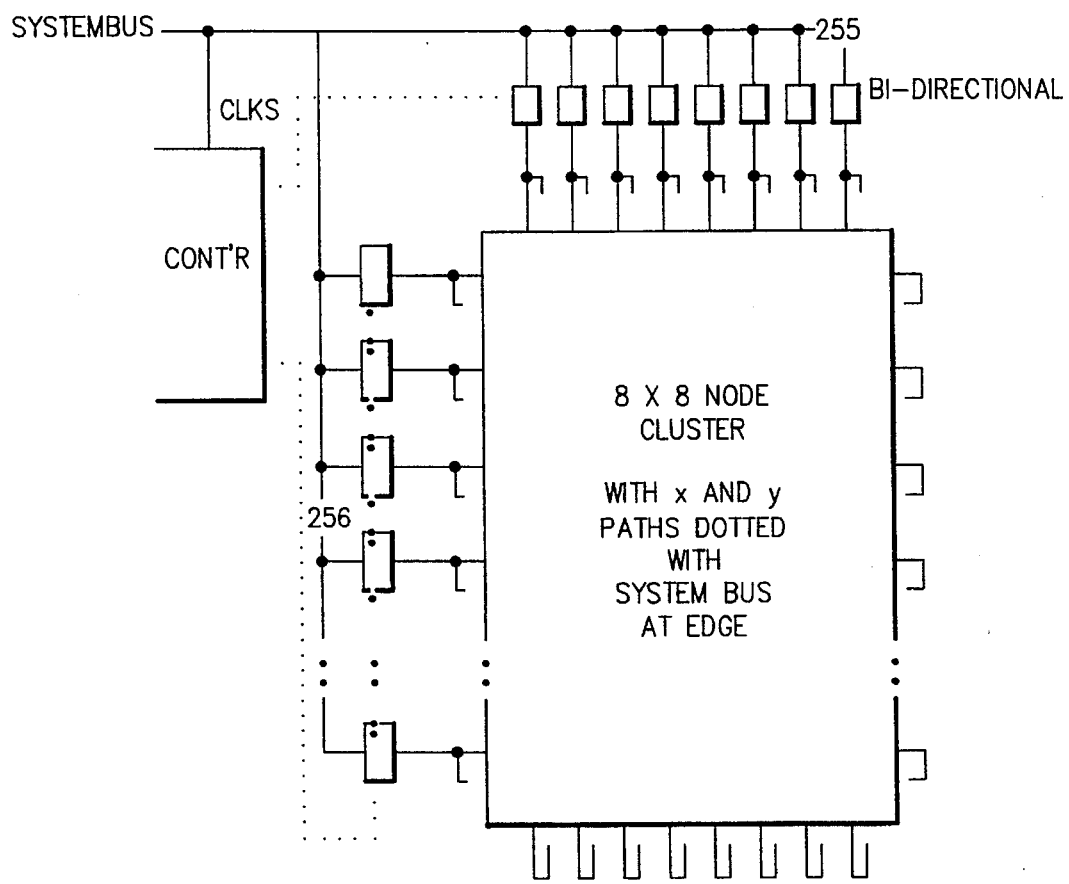
FIG. 6 is a schematic illustrative of a zipper connection on a two orthogonal connections to a Cluster.

FIG. 6 shows how this concept might be expanded to put a zipper on two "edges" 255,256 of a cluster. This approach increases the I/O bandwidth to approximately 114 megabytes per second if different data is passed into each zipper, or supports approximately 57 megabytes per second of orthogonal data movement within the array if identical data is passed into each zipper. Orthogonal data movement supports fast transpose and matrix-multiply operations within the array. In theory, there could be a zipper on every internodal interface. In practice, each PME with a zipper interface must be able to move array I/O data along to other PMEs to avoid filling its memory and being unable to accept more data. The number of zippers is limited by the technology which determines how much memory is available at each PME and the rate at which zipper data can be moved between the PMEs on the zipper and other PMEs within the array.

FIG. 1 shows an array of n clusters. In the preferred embodiment, each cluster supports two orthogonal zippers. The maximum array I/O rate for the array is 2n×57 megabytes per second. The maximum orthogonal array I/O rate for the array is n×157 megabytes per second.

The preferred embodiment of the zipper has two modes of operation, zipper input and zipper output. A zipper input operation transfers data from the array controller to a selected group of PMEs on the cluster. Zipper input operation is initiated by the array controller runtime software. Array Controller runtime software first uses PME SIMD mode broadcast commands (see "SIMD/MIMD Processing Memory Element" referenced above) to put the PMEs along the zipper interface in one of two modes: Zipper Normal (ZN) or Zipper Circuit Switched (ZC). The array controller runtime software then provides the SIMD PME software in ZN mode with a count of words to receive. In ZN Mode, a PME can receive data from the X interface 80 (FIG. 4), but it must first set up an input buffer in memory for that interface. Two locations in memory are reserved to contain the starting address of each input data buffer 232 and the number of words contained in the buffer 233 (FIG. 7). In addition, PME CONTROL REGISTER 2 (FIG. 8) contains mask bits which both enable the input interfaces 173 and allow I/O interrupts 172. Broadcast SIMD PME software loads the reserved memory locations to define the output data block and loads PME CONTROL REGISTER 2 to enable input data transfers. In ZN mode, the PME idles and awaits an I/O interrupt or toggle to ZC mode.

Figure 9:
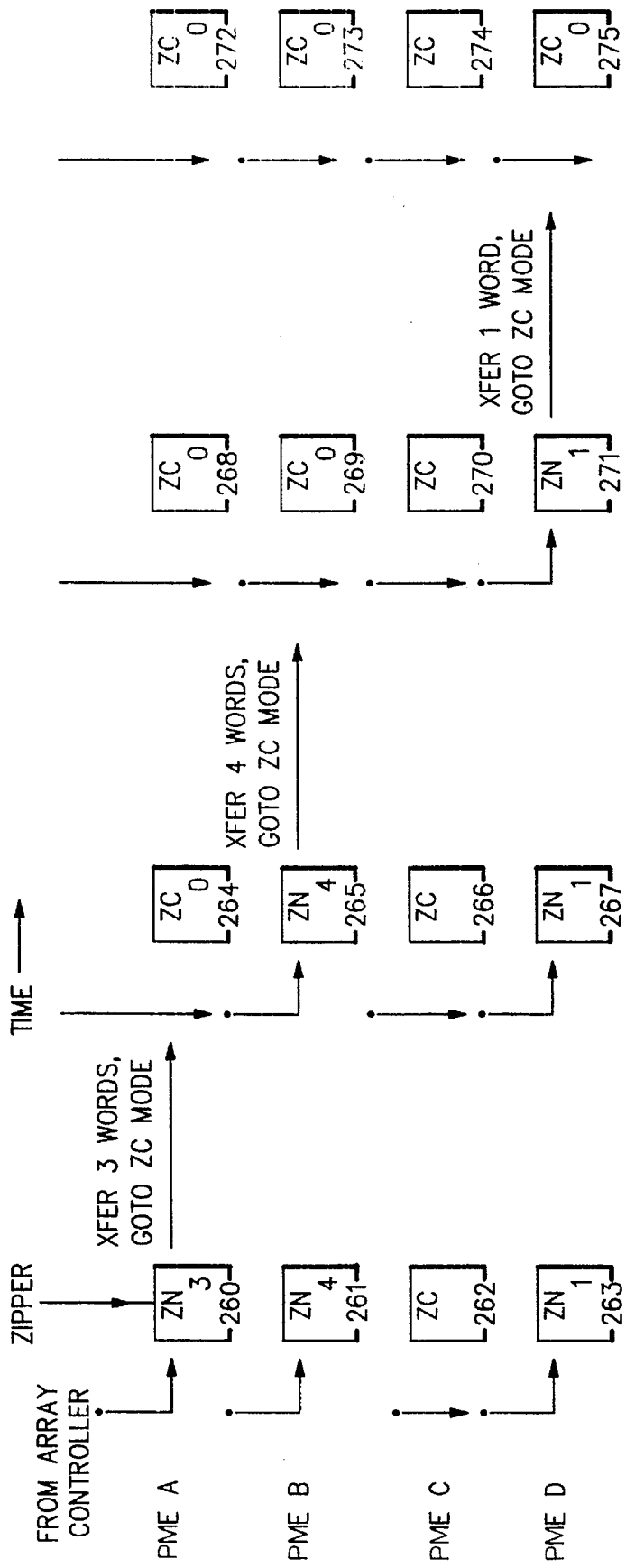
FIG. 9 is a schematic illustrative of the Zipper Receive Sequence.

A zipper input operation for one possible configuration of PMEs is shown in FIG. 9, where an example of a transfer of 8 words to 3 different PMEs is shown. The data interface (zipper) transfers data to PME 260 and is moved from PME to PME thru the array.

More specifically, 8 words are transferred from the Array Controller to the Cluster Card; 3 words for PE "A", 4 words for PE "B", and 1 word for PE "D". PE "C" does not receive data but is needed to provide a path from PE "B" to PE "D". In FIG. 9, ZN denotes zipper normal mode, ZC denotes zipper circuit switched mode and the word count appears in the lower left corner of each PE block.

In our preferred embodiment, the array controller initially sets PME A 260, B 261, and D 263 in ZN mode and PME C 262 in ZC mode. For a zipper input operation, setting the "Z" 163 and "CS" 170 bits in PME CONTROL REGISTER 1 places the PME in ZC mode. Setting the "Z" 163 bit and resetting the "CS" 170 bit places the PME in ZN mode. PME A, B, and D have initial receive counts of 3, 4, and 1 assigned. PME receives its 3 data words using the normal receive sequence. When the word count goes to zero, hardware in PME A resets the "CS" 170 bit in PME CONTROL REGISTER 1, causing PME A 264 to go into ZC mode. The same sequence occurs in PME B 269 and D 271. On the last word transfer (to PME D) 271, the array controller can insert a Transfer Complete (TC) tag 224 bit (FIG. 12C). When the TC bit is set, PMEs A–D will detect the bit and generate an I/O interrupt 171 request. If the TC 224 bit is not set, PME A–D remain in ZC 272–275 mode at the end of the transfer.

Figure 11:
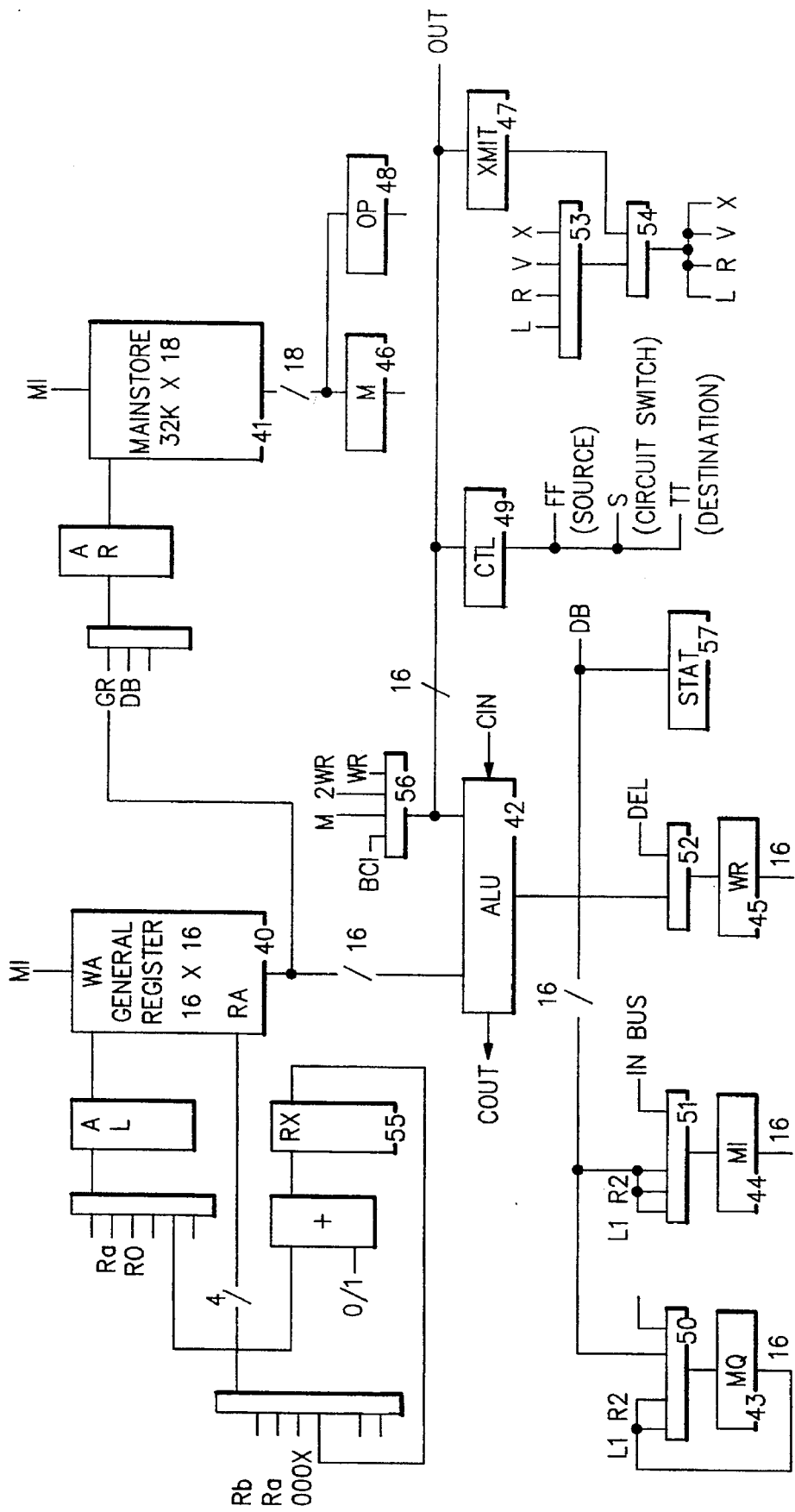
FIG. 11 is a data flow illustrative of the embodiment of the Processing Memory Element (PME). The principle sections of the data flow include mainstore, general regs, ALU and Regs, and a portion of the interconnect mesh.

When a Request 240 (FIG. 10) is detected on the zipper interface, the receiving PME sends out an Acknowledge 241 (FIG. 10) and loads the data into the Input Register 87 (FIG. 4). A receive sequence is then initiated which fetches and decrements the count 233 (FIG. 7), fetches and increments the input buffer address 232 (FIG. 7), and stores the data word in the PME memory 41 (FIG. 11). The receive sequence is analogous to the transmit sequence. It breaks into the PME idling to cycle-steal the access to memory 41 and the ALU 42 to update the I/O address and count fields and to load the input data word into memory 41. This sequence continues until either the count reaches zero which switches the mode to ZC or a TC Tag is received which sets the corresponding input interrupt register bit 171 with an interrupt code indicating "Transfer Complete."

A PME will generate an Acknowledge in response to a request if the following conditions are met:

The Input Register 87,100 (FIGS. 4 and 14) is free,

Requests are not inhibited 174 (FIG. 8),

An interrupt is not pending on that request input,

The Request input is not circuit switched, and

The Request has the highest priority of all current requests.

The Input Register 87,100 becomes busy from the time an Acknowledge 226 (FIG. 15) is generated until the receive sequence stores the data word in memory. When the input register is busy, Acknowledge is inhibited. The busy condition prevents the input register from being overwritten before a receive sequence occurs (since a receive sequence could be delayed for memory refresh).

Referring to FIGS. 4,8,12 and 15, if the TC tag bit 224 is sent from the transmitting zipper, an I/O interrupt latch is set 171 for that interface. No further Acknowledges 226 on that interface will be generated until the interrupt latch is reset by PME runtime software. For example, if the TC tag bit 224 is set on a data transfer from the X interface 82, further requests from X are inhibited until the L interrupt is taken and the L interrupt latch is reset.

If the data word is transferred with the TC tag 224 bit set and the receiving PME is in ZN mode, an I/O interrupt is generated 777 for the external interface, and the interrupt code 190 is set to reflect TC. In addition, should the buffer count go to zero before a TC tag is sent from the transmitting zipper, the PME toggles to ZC mode.

When a PME is in ZN receive mode, it can only execute memory refresh sequences and receive sequences for the zipper input. This is necessary since the zipper data transfer can occur at the maximum PME clock rate. No time can be allowed for PME instruction execution or receive sequences for the non-zipper inputs. While in ZN mode, the PME hardware inhibits all input requests except the zipper input request. A PME in ZC mode is capable of the full range of operations for a PME in circuit switched mode as explained in "PME Store and Forward/Circuit Switched Modes". This includes the ability to use splitter submode on zipper data.

A zipper output operation transfers data from a selected group of PMEs in a cluster to the array controller. Zipper output operation is initiated by the array controller runtime software which first uses SIMD mode broadcast commands to put the PMEs around the zipper interface in one of two modes, Zipper Normal or Zipper Circuit Switched. The array controller runtime software then provides the PME SIMD software in ZN mode with a count of words to send.

FIG. 7 is schematics illustrative of the reserved storage locations for interrupts and I/O processing. The actual memory location is determined by adding the Offset to the starting Storage Address for the level range. For example, the RIGHT Input Data Buffer Count is located in "X" 00C0+003D or in 'X' 00FD.

Conceptually, data is transferred from the originating PME's main memory to the Host Computer's main memory. In the preferred embodiment, for each interface two locations in memory are reserved to contain the starting address of the output data block 230 (FIG. 7) and the number of words contained in the block 231. In addition, PME CONTROL REGISTER 1, see FIG. 8, controls the destination and mode of the data output. Broadcast SIMD PME software loads PME CONTROL REGISTER 1 to define transfer mode. Either Broadcast SIMD PME software or PME runtime software loads the designated memory locations with the data to be transferred to the host. Then Broadcast SIMD PME software loads the address and count into the designated memory locations. Next it loads the PME CONTROL REGISTER 1, and finally it executes an OUT instruction which initiates the data transmit sequence.

Figure 13:
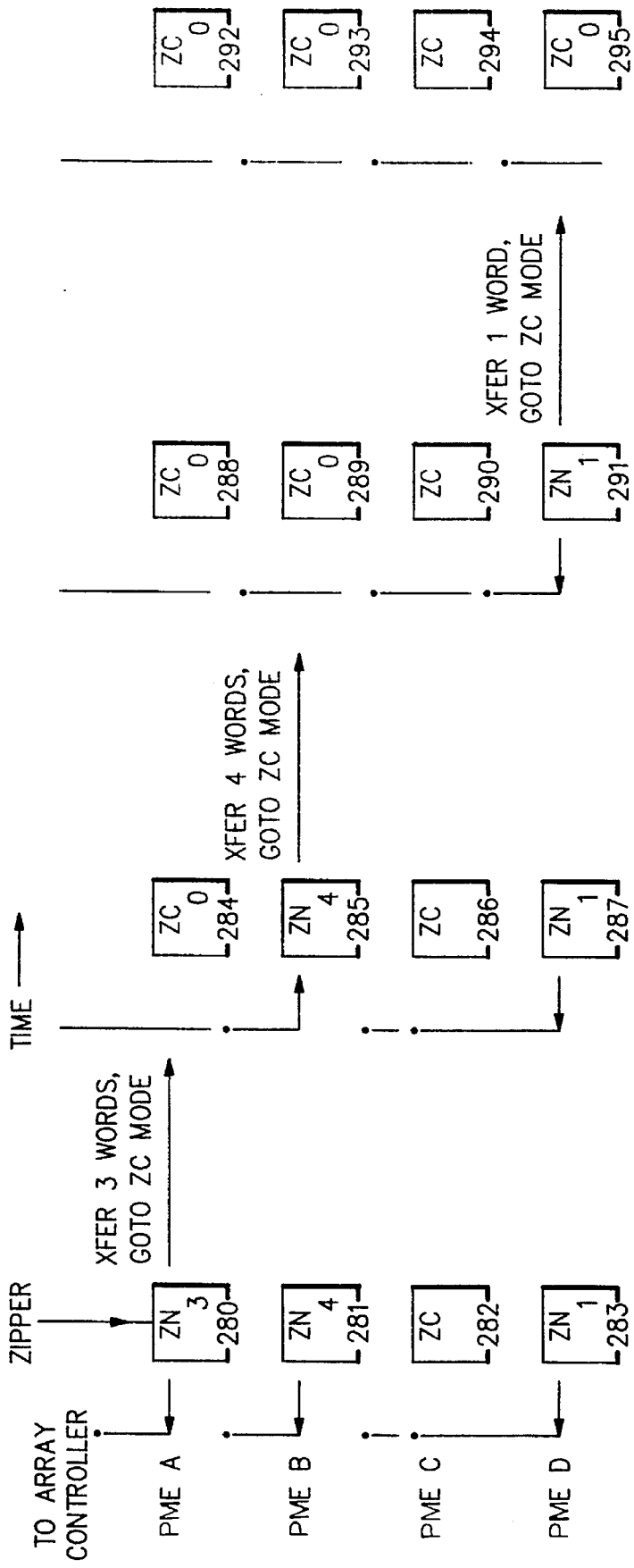
FIG. 13 is a schematic illustrative of the Zipper Transmit Sequence.

A zipper output operation for one possible configuration of PMEs is shown in FIG. 13, where an example of a transfer of 8 words to 3 different PMEs is shown. The data interface (zipper) transfers data from PME 280 and is moved from PME to PME thru the array.

More specifically, 8 words are transferred from the Cluster Card to the Array Controller; 3 words for PE "A", 4 words for PE "B", and 1 word for PE "D". PE "C" does not send data but is needed to provide a path from PE "D" to PE "B". In FIG. 13, ZN denotes zipper normal mode, ZC denotes zipper circuit switched mode and the word count appears in the lower left corner of each PE block.

In this example, referring to FIGS. 8A, 12C and 13, the array controller initially sets PME A 280, B 281, and D 283 in ZN mode and PME C 282 in ZC mode. For a zipper output operation, setting the "Z" 163 and "CS" 170 bits in PME CONTROL REGISTER 1 places the PME in ZC mode. Setting the "Z" 163 bit and resetting the "CS" 170 bit places the PME in ZN mode. PME A, B, and D have counts of 3, 4, and 1 assigned. PME A sends its 3 data words using the normal transmit sequence. When the word count goes to zero, hardware in PME A resets the "CS" 170 bit in PME CONTROL REGISTER 1 causing PME A 284 to go into ZC mode. The same sequence occurs in PME B 289 and D 295. If PME D has PME CONTROL REGISTER "TC" 164 set, on the last word transfer (from PME D), PME D inserts a Transfer Complete (TC) tag 224 bit. If the TC tag is set, PMEs A–D will detect the bit and generate an I/O interrupt 171 request. If the TC tag is not set, PMEs A–D remain in ZC mode at the end of the transfer.

For each data word sent, the transmit sequence decrements the count 231, increments the starting address 230, and reads a data word from memory 41. The data word is loaded into the Transmit Register 47,96 and sent to the selected PME 97,161 interface. The transmit sequence breaks into the PME idling to cycle-steal the access to memory 41 and the ALU 42 to update the I/O address and count fields and to load the Transmit Register 47,96 (FIG. 11). For zipper transfers, the CX bit 165 in PME CONTROL REGISTER 1 is set so that the PME processor idles until the transmit sequence completes. This sequence continues until the count reaches zero.

The data transfer interface is four bits wide 97; thus, each 16-bit data word 220 is sent in four 4-bit pieces (nibbles). Also, a Tag nibble 221 and Parity nibble 222 are sent with the data. The transfer format is shown in 223.

The transmit sequence is shown in FIG. 15. On the interface, the transmitting PME generates a Request 225 to the receiving zipper interface. When an Acknowledge 226 is received, the transmitting PME begins the data transfer, and another transmit sequence can occur. The next transmit sequence will not occur until an acknowledge has been received.

If the TC bit 164 is set in PME CONTROL REGISTER 1, the TC bit 224 will be set in the tag field of the last data word transferred. This bit lets the receiving zipper know that the data transfer has ended.

When a PME is in ZN transmit mode, it can only execute transmit and memory refresh sequences. This is necessary since the zipper data transfer can occur at the maximum PME clock rate. No time can be allowed for PME instruction execution or receive sequences for the non-zipper inputs. While in ZN transmit mode the PME hardware inhibits all input requests. A PME in ZC mode is capable of the full range of operations for a PME in circuit switched mode as in "PME Store and Forward/Circuit Switched Mode." This includes the ability to use splitter submode on zipper data.

Figure 16:
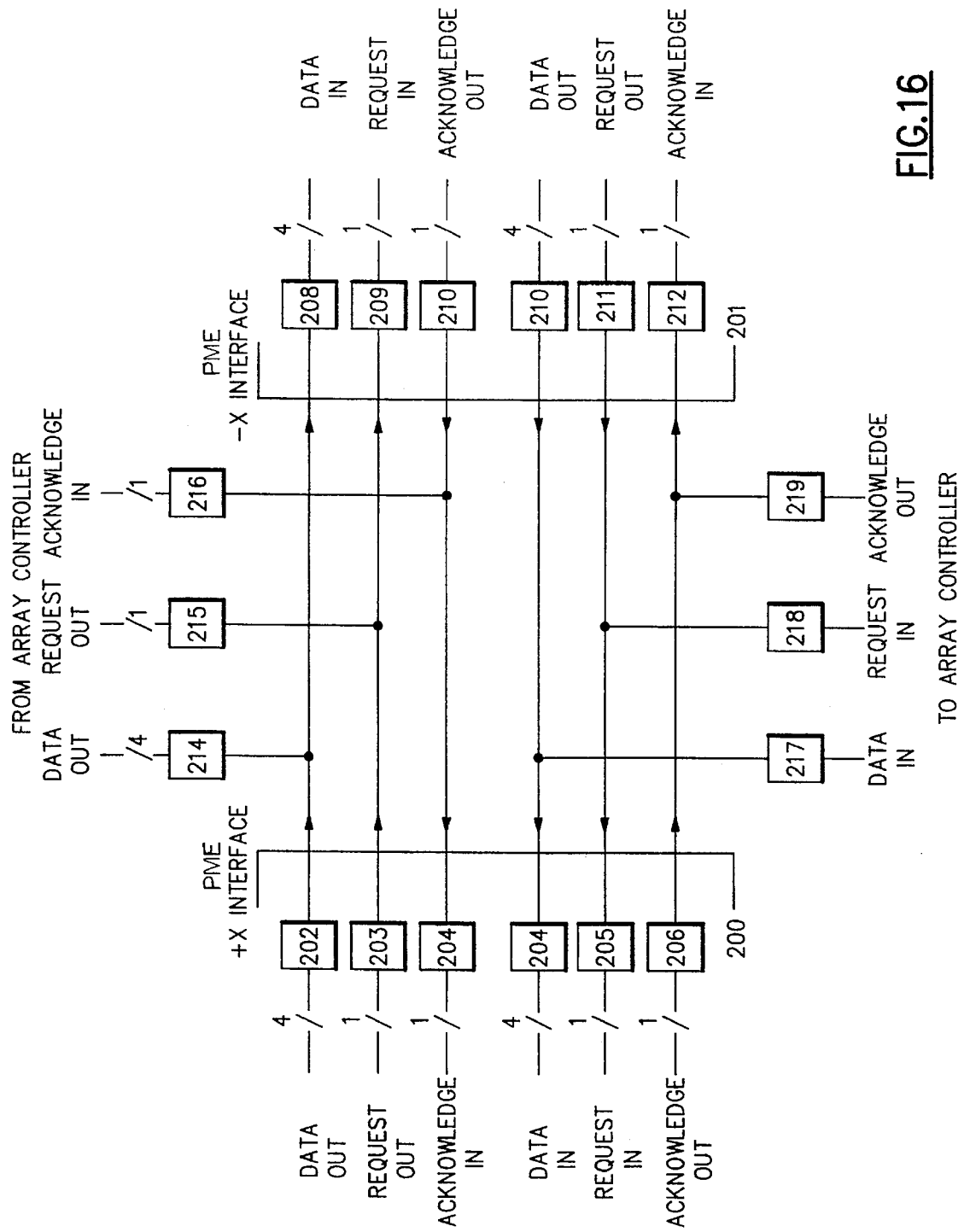
FIG. 16 is a schematic illustrative of the physical Zipper interface.

The zipper interface connects the array controller to node on the cluster as shown at the top and bottom of FIG. 16. The normal interface consists of two nibble (4-bit) uni-directional point-to-point interfaces which provide bi-directional full duplex transfers between the two PMEs. We prefer to employ the process described for the transfer of six nibbles from one PME to the other as in "PME Store and Forward/Circuit Switched Modes." Essentially, information is transferred from the PME on the left 200 using the data path 202, request line 203, and acknowledge line 204. Concurrently, information can be transferred from the PME on the right 201 using the data path 210, request line 211, and acknowledge line 212. When the zipper is installed on an interface, data path 214, request line 215, and Acknowledge path 216 are added to move data into the array, and data path 217, request line 218, and Acknowledge path 219 are added to move data out of the array. Array Controller runtime software causes PME 200 runtime software to disable 202, 203, and 204 when it wants to do a zipper transmit sequence to PME 201. Likewise, array controller runtime software causes PME 201 runtime software to disable 210, 211, and 212 when it wants to do a zipper receive sequence to PME 200. Note that the placement of the zipper logic is entirely arbitrary to the implementation. It could as easily be placed on the +X and –X interface of the same node or could be placed on any or all of the W, Y, or Z node interfaces.

While we have described our preferred embodiment of our invention, it will be understood that those skilled in the art, both now and in the future, may make make various improvements and enhancements which fall within the scope of the claims which follow. These claims should be construed to maintain the proper protection for the invention first disclosed.

What is claimed is:

1. A computer system, comprising:

a plurality of nodes interconnected as a multi-dimensional network with parallel communication paths between processor-memory elements (PME's) each having a processor and a local memory along communication paths providing a processing array, each node comprising a plurality of PME's having communication paths to other PME's;

an array director including:

an application program interface for receiving and translating commands and data directed to said processing array;

a cluster synchronizer;

a cluster controller; and a zipper for breaking node connections and providing I/O communications to nodes;

wherein the cluster synchronizer and the cluster controller route data and commands to appropriate clusters and provide load balancing among clusters;

wherein the computer system is organized as a massively parallel machine with nodes interconnected as a multi-dimensional network cluster with parallel communication paths between PME's along communication paths both internal and external to a node, and further comprising means for breaking communication paths between PME's providing external I/O communication;

wherein said processing array has rings for communication which can be broken to provide an interface for communications external to a node.

2. The computer system of claim 1, wherein breaking of said rings provides a number of network edges equal to the number of orthogonal logical breaks of said rings.

3. The computer system of claim 2, wherein:

said rings connect said nodes in an multi-dimensional orthogonal manner;

orthogonal logical breaking of the rings occurs in a plurality of orthogonal dimensions; and data is passed into and out of said network through the multi-dimensional orthogonal ring breaks.

4. The computer system of claim 3, wherein said nodes operate in normal and circuit switched modes;

normal node providing for data passage through said network edge into or out of memory of a node on said network edge; and circuit switched mode providing for data passage through said network edge and a node on said network edge and into or out of memory of a node not located on said network edge.

5. The computer system of claim 4, wherein data is passed through said network edge and through a plurality of nodes before going into or out of memory of a node.

6. A computer system according to claim 1, wherein nodes are coupled to other nodes as a 4 d modified hypercube providing eight external ports, with nodes connected via ports to form a ring, and rings being interconnected as rings of rings, and further comprising means for logically breaking rings to provide an edge for external I/O communication.

7. A computer system according to claim 1, further providing a modified hypercube interconnection of nodes having a topology of rings within rings and wherein rings are logically broken and two ends of a broken ring are connected for external I/O communication as a logical operation.

8. A computer system according to claim 1, further comprising a broadcast bus connected to said plurality of nodes and an I/O interface for the processor array which exists as a separate interface into the PME's, said I/O interface being established on at least one edge of a hypercube network and connected to said broadcast bus at multiple nodes in the network and in multiple directions.

9. A computer system according to claim 1, further comprising:

a plurality of processor-memory elements (PME's) having communication paths to other PME's and a node identity;

wherein said processing array has interfaces to attach external devices to PME's of said processing array.

10. A network data transfer apparatus, comprising:

a network comprising rings of toroidally interconnected nodes, each of said nodes comprising a plurality of interconnected processor-memory elements (PME's) having a processor and a local memory;

means for logically breaking said rings along a dimension orthogonal to said rings establishing a network edge;

means for dynamic toggling between an edgeless network and an edged network; and means for data transfer into and out of said network through said network edge;

wherein breaking of said rings provides a number of network edges equal to the number of orthogonal logical breaks of said rings;

wherein said rings connect said nodes in an multi-dimensional orthogonal manner, orthogonal logical breaking of the rings occurs in a plurality of orthogonal dimensions, and data is passed into and out of said network through the multi-dimensional orthogonal ring breaks;

wherein said nodes operate in normal and circuit switched modes; normal node providing for data passage through said network edge into or out of memories of a node on said network edge; and circuit switched mode providing for data passage through said network edge and a node on said network edge and into or out of memories of a node not located on said network edge;

wherein data is passed through said network edge and through a plurality of nodes before going into or out of memories of a node; and wherein a number of nodes are interconnected providing for each node to sequentially take input data from said network edge until its memories are full and then to change to circuit switched mode providing for another node to take input data.

11. The apparatus of claim 10, wherein at least one processing element is a processor-memory element (PME) which functions in SIMD/MIMD modes.

12. The apparatus of claim 10, further comprising:

means for dynamically enabling and disabling a circuit switch path through PME's; and means for PME's to determine that a last word of a message has passed through said circuit switch path.

13. The apparatus of claim 10, further comprising means for alternating data transfer path between a plurality of neighboring nodes.

14. The apparatus of claim 10, wherein the number of orthogonal logical breaking of the rings is two.

* * * * *